United States Patent
Dresevic et al.

(10) Patent No.: US 7,317,834 B2
(45) Date of Patent: * Jan. 8, 2008

(54) SERIAL STORAGE OF INK AND ITS PROPERTIES

(75) Inventors: Bodin Dresevic, Bellevue, WA (US); Rudolph Balaz, Redmond, WA (US); Donald D. Karlov, Woodinville, WA (US); Subha Bhattacharyay, Bellevue, WA (US); Patrick Haluptzok, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/019,468

(22) Filed: Dec. 23, 2004

(65) Prior Publication Data

US 2005/0103871 A1 May 19, 2005

Related U.S. Application Data

(62) Division of application No. 09/852,799, filed on May 11, 2001.

(60) Provisional application No. 60/212,825, filed on Jun. 21, 2000.

(51) Int. Cl.
*G06K 9/18* (2006.01)

(52) U.S. Cl. .................. 382/186; 345/179; 715/541

(58) Field of Classification Search ........ 382/187–198, 382/293–300, 186
See application file for complete search history.

(56) References Cited

U.S. PATENT DOCUMENTS

| | | | |
|---|---|---|---|
| 4,156,237 A | 5/1979 | Okata et al. | |
| 4,521,770 A | 6/1985 | Rhyne | |
| 4,709,348 A | 11/1987 | Horn et al. | |
| 5,091,964 A | 2/1992 | Shimomura | |
| 5,146,552 A | 9/1992 | Cassorla et al. | |
| 5,148,155 A | 9/1992 | Martin et al. | |
| 5,239,466 A | 8/1993 | Morgan et al. | |
| 5,349,648 A | 9/1994 | Handley | |
| 5,434,965 A | 7/1995 | Matheny et al. | |
| 5,465,325 A | 11/1995 | Capps et al. | |
| 5,473,742 A | 12/1995 | Polyakov et al. | |
| 5,509,663 A | 4/1996 | Otake et al. | |

(Continued)

FOREIGN PATENT DOCUMENTS

EP 902379 A2 3/1999

(Continued)

OTHER PUBLICATIONS

Bill N. Schilit et al., "Digital Library Information Appliances", pp. 217-225, 1998.

(Continued)

*Primary Examiner*—Matthew C. Bella
*Assistant Examiner*—Sath V. Perungavoor
(74) *Attorney, Agent, or Firm*—Banner & Witcoff, Ltd

(57) ABSTRACT

Ink is stored in a data structure that permits later retrieval by applications. The ink includes stroke information and property information. Properties may be associated globally with the ink strokes and/or with each stroke individually. Aspects include a data structure that supports ink for multiple applications. Using the storage system, method, and data structure, various applications may expand on ink to include additional attributes while permitting the ink to be used in applications not supporting the additional attributes. When encountering an unknown tag, the applications will skip past the end of the tag and its associated data to start reading the next tag.

4 Claims, 20 Drawing Sheets

U.S. PATENT DOCUMENTS

| | | | |
|---|---|---|---|
| 5,523,775 A * | 6/1996 | Capps | 345/179 |
| 5,534,893 A * | 7/1996 | Hansen et al. | 345/179 |
| 5,572,643 A | 11/1996 | Judson | |
| 5,588,141 A * | 12/1996 | Smith et al. | 719/315 |
| 5,613,019 A | 3/1997 | Altman et al. | |
| 5,625,833 A | 4/1997 | Levine et al. | |
| 5,632,022 A | 5/1997 | Warren et al. | |
| 5,646,650 A | 7/1997 | Miller et al. | |
| 5,666,139 A | 9/1997 | Thielens et al. | |
| 5,680,480 A | 10/1997 | Beernink et al. | |
| 5,680,636 A | 10/1997 | Levine et al. | |
| 5,682,439 A | 10/1997 | Beernink et al. | |
| 5,687,254 A * | 11/1997 | Poon et al. | 382/229 |
| 5,687,331 A | 11/1997 | Volk et al. | |
| 5,708,825 A | 1/1998 | Sotomayor | |
| 5,717,879 A | 2/1998 | Moran et al. | |
| 5,727,129 A | 3/1998 | Barrett et al. | |
| 5,729,687 A | 3/1998 | Rothrock et al. | |
| 5,737,599 A | 4/1998 | Rowe et al. | |
| 5,745,116 A | 4/1998 | Pisutha-Arnond | |
| 5,758,358 A * | 5/1998 | Ebbo | 707/203 |
| 5,760,773 A | 6/1998 | Berman et al. | |
| 5,778,404 A | 7/1998 | Capps et al. | |
| 5,790,818 A | 8/1998 | Martin | |
| 5,801,687 A | 9/1998 | Peterson et al. | |
| 5,818,456 A | 10/1998 | Cosman et al. | |
| 5,821,925 A | 10/1998 | Carey et al. | |
| 5,832,263 A | 11/1998 | Hansen et al. | |
| 5,838,914 A | 11/1998 | Carleton et al. | |
| 5,845,262 A | 12/1998 | Nozue et al. | |
| 5,867,593 A | 2/1999 | Fukuda et al. | |
| 5,877,757 A | 3/1999 | Baldwin et al. | |
| 5,889,523 A | 3/1999 | Wilcox et al. | |
| 5,893,126 A | 4/1999 | Drews et al. | |
| 5,893,132 A | 4/1999 | Huffman et al. | |
| 5,918,236 A | 6/1999 | Wical | |
| 5,920,647 A | 7/1999 | Nowlan et al. | |
| 5,920,694 A | 7/1999 | Carleton et al. | |
| 5,931,912 A | 8/1999 | Wu et al. | |
| 5,933,140 A | 8/1999 | Strahorn et al. | |
| 5,937,416 A | 8/1999 | Menzel | |
| 5,948,040 A | 9/1999 | DeLorme et al. | |
| 5,950,214 A | 9/1999 | Rivette et al. | |
| 5,953,735 A | 9/1999 | Forcier | |
| 5,963,205 A | 10/1999 | Sotomayor | |
| 5,978,818 A | 11/1999 | Lin | |
| 5,983,248 A | 11/1999 | De Rose et al. | |
| 5,986,665 A | 11/1999 | Wrey et al. | |
| 6,005,987 A | 12/1999 | Nakamura et al. | |
| 6,011,537 A | 1/2000 | Slotznick | |
| 6,012,055 A | 1/2000 | Campbell et al. | |
| 6,018,334 A | 1/2000 | Eckerberg et al. | |
| 6,018,342 A | 1/2000 | Bristor | |
| 6,018,742 A | 1/2000 | Herbert, III | |
| 6,035,330 A | 3/2000 | Astiz et al. | |
| 6,049,812 A | 4/2000 | Bertram et al. | |
| 6,052,514 A | 4/2000 | Gill et al. | |
| 6,054,990 A | 4/2000 | Tran | |
| 6,081,829 A | 6/2000 | Sidana | |
| 6,088,481 A | 7/2000 | Okamoto et al. | |
| 6,091,930 A | 7/2000 | Mortimer et al. | |
| 6,094,197 A | 7/2000 | Buxton et al. | |
| 6,101,280 A | 8/2000 | Reynolds | |
| 6,118,437 A | 9/2000 | Fleck et al. | |
| 6,122,649 A | 9/2000 | Kanerva et al. | |
| 6,128,007 A | 10/2000 | Seybold | |
| 6,157,381 A | 12/2000 | Bates et al. | |
| 6,181,344 B1 | 1/2001 | Tarpenning et al. | |
| 6,195,679 B1 | 2/2001 | Bauersfeld et al. | |
| 6,195,694 B1 | 2/2001 | Chen et al. | |
| 6,199,082 B1 | 3/2001 | Ferrel et al. | |
| 6,201,528 B1 * | 3/2001 | Lucas et al. | 345/611 |
| 6,205,455 B1 | 3/2001 | Umen et al. | |
| 6,230,171 B1 | 5/2001 | Pacifici et al. | |
| 6,239,792 B1 | 5/2001 | Yanagisawa et al. | |
| 6,262,719 B1 | 7/2001 | Bi et al. | |
| 6,271,840 B1 | 8/2001 | Finseth et al. | |
| 6,279,005 B1 | 8/2001 | Zellweger | |
| 6,279,014 B1 | 8/2001 | Schilit et al. | |
| 6,279,153 B1 * | 8/2001 | Bi et al. | 717/171 |
| 6,289,362 B1 | 9/2001 | Van Der Meer | |
| 6,301,590 B1 | 10/2001 | Siow et al. | |
| 6,321,244 B1 | 11/2001 | Liu et al. | |
| 6,326,970 B1 | 12/2001 | Mott et al. | |
| 6,331,867 B1 | 12/2001 | Eberhard et al. | |
| 6,332,039 B1 | 12/2001 | Bando et al. | |
| 6,335,727 B1 | 1/2002 | Morishita et al. | |
| 6,340,967 B1 | 1/2002 | Maxted | |
| 6,356,287 B1 | 3/2002 | Ruberry et al. | |
| 6,369,811 B1 | 4/2002 | Graham et al. | |
| 6,373,490 B1 | 4/2002 | Bendiksen et al. | |
| 6,384,847 B1 | 5/2002 | Rabenhorst | |
| 6,389,434 B1 | 5/2002 | Rivette et al. | |
| 6,393,422 B1 | 5/2002 | Wone | |
| 6,397,233 B1 | 5/2002 | Okawa et al. | |
| 6,405,221 B1 | 6/2002 | Levine et al. | |
| 6,421,065 B1 | 7/2002 | Walden et al. | |
| 6,446,110 B1 | 9/2002 | Lection et al. | |
| 6,460,058 B2 | 10/2002 | Koppolu et al. | |
| 6,486,895 B1 | 11/2002 | Robertson et al. | |
| 6,490,603 B1 | 12/2002 | Keenan et al. | |
| 6,529,920 B1 | 3/2003 | Arons et al. | |
| 6,535,294 B1 | 3/2003 | Arledge, Jr. et al. | |
| 6,539,370 B1 | 3/2003 | Chang et al. | |
| 6,549,220 B1 | 4/2003 | Hsu et al. | |
| 6,549,675 B2 | 4/2003 | Chatterjee | |
| 6,560,621 B2 | 5/2003 | Barile | |
| 6,563,503 B1 * | 5/2003 | Comair et al. | 345/473 |
| 6,571,295 B1 | 5/2003 | Sidana | |
| 6,642,458 B2 | 11/2003 | Panagrossi, III et al. | |
| 6,720,977 B1 | 4/2004 | Bourdev et al. | |
| 6,909,430 B2 | 6/2005 | Dresevic et al. | |
| 6,956,970 B2 * | 10/2005 | Dresevic et al. | 382/187 |
| 7,006,711 B2 * | 2/2006 | Dresevic et al. | 382/299 |
| 7,137,076 B2 * | 11/2006 | Iwema et al. | 715/863 |
| 7,158,675 B2 * | 1/2007 | Gounares et al. | 382/187 |
| 7,167,585 B2 * | 1/2007 | Gounares et al. | 382/187 |
| 7,203,365 B2 * | 4/2007 | Dresevic et al. | 382/189 |
| 7,259,753 B2 * | 8/2007 | Keely et al. | 345/179 |
| 7,283,670 B2 * | 10/2007 | Wakeam et al. | 382/186 |
| 7,284,192 B2 * | 10/2007 | Kashi et al. | 715/512 |
| 2002/0013795 A1 | 1/2002 | Dresevic et al. | |
| 2002/0097261 A1 | 7/2002 | Gottfurcht et al. | |
| 2003/0091234 A1 * | 5/2003 | Lapstun et al. | 382/187 |
| 2003/0101163 A1 * | 5/2003 | Lui et al. | 707/1 |
| 2003/0215140 A1 * | 11/2003 | Gounares et al. | 382/187 |
| 2003/0217336 A1 * | 11/2003 | Gounares et al. | 715/541 |
| 2004/0021647 A1 * | 2/2004 | Iwema et al. | 345/179 |
| 2005/0041866 A1 * | 2/2005 | Silverman et al. | 382/188 |
| 2005/0052433 A1 * | 3/2005 | Silverman et al. | 345/179 |
| 2005/0053283 A1 * | 3/2005 | Wakeam et al. | 382/186 |
| 2005/0147300 A1 * | 7/2005 | Dresevic et al. | 382/186 |
| 2005/0289452 A1 * | 12/2005 | Kashi et al. | 715/512 |
| 2006/0010368 A1 * | 1/2006 | Kashi | 715/512 |
| 2006/0062470 A1 * | 3/2006 | Zhu et al. | 382/186 |
| 2006/0093218 A1 * | 5/2006 | Gounares et al. | 382/187 |
| 2006/0093219 A1 * | 5/2006 | Gounares et al. | 382/187 |
| 2006/0212802 A1 * | 9/2006 | Wakeam et al. | 715/513 |

FOREIGN PATENT DOCUMENTS

| | | |
|---|---|---|
| EP | 001016983 A2 | 5/2000 |
| EP | 1016983 A2 | 7/2000 |
| JP | 11327789 | 11/1999 |

| | | |
|---|---|---|
| WO | WO 96/20908 | 7/1996 |
| WO | WO 97/22109 | 6/1997 |
| WO | WO 98/06054 | 2/1998 |
| WO | WO 87/01481 | 3/1998 |
| WO | WO 98/09446 | 3/1998 |
| WO | WO 99/49383 | 9/1999 |

OTHER PUBLICATIONS

Microsoft® Windows Graphical Environment for Pen Computing SDK, Guide to Pen Programming, Aug. 2, 1991.
Microsoft Windows Graphical Environment for Pen Computing—Introduction to Microsoft Windows for Pen Computing, pp. 1-13, 2004.
Internet Printout: About Interchange File Format, http://www.borg.com, dated May 10, 2001.
Internet Printout: http://ccrma-www.stanford.edu, WAVE PCM soundfile format, dated May 10, 2001.
"EA IFF 85" Standard for Interchange Format Files, 1985.
Internet Printout: http://www.daubnet.com/formats/RIFF.html, Resource Interchange Format, dated May 10, 2001.
Internet Printout: http://www.borg.com, Opening a RIFF file for reading or writing, dated May 10, 2001.
Internet Printout: http://burks.brighton.ac.uk/burks/foldoc/32/57.htm, Interchange File Format, dated May 10, 2001.
Internet Printout: http://www.faqs.org/faqs/graphics/fileformats-faq/part1/preamble.html, Graphics File Formats FAQ (Part 1 of 4): General Graphics Format Questions, dated May 10, 2001
Internet Printout: http://www.faqs.org/faqs/graphics/fileformats-faq/part2/preamble.html, Graphics File Formats FAQ (Part 2 of 4): Image Conversion and Display Programs, dated May 10, 2001.
Internet Printout: http://www.faqs.org/faqs/graphics/fileformats-faq/part3/preamble.html, Graphics File Formats FAQ (Part 3 of 4): Where to Get File Format Specifications, dated May 10, 2001.
Internet Printout: http://www.faqs/graphics/fileformats-faq/part4/preamble.html, Graphics File Formats FAQ (Part 4 of 4): Tips and Tricks of the Trade, dated May 10, 2001.
Internet Printout: http://msdn.microsoft.com/library/psdk/multimed/mmio, Resource Interchange File Format Services, dated May 10, 2001.
Internet Printout: http://n.ethz.ch/student/hhug/simpl/doc/iff_h-source.html, iff.h, dated May 10, 2001.
Internet Printout: http://www.cica.indiana.edu/graphics/image.formats.html, Center for Innovative Computer Applications, dated May 10, 2001.
Internet Printout: http://www.timestream.com/mmedia/making/hiff1.html, HIFF Format Specification, dated May 10, 2001.
Graphics Interchange Format (sm), Version 89a, 1990, CompuServe Incorporated.
EP Search Report dated Jul. 8, 2004.
JOT—A Specification for an Ink Storage and Interchange Format, 1996.
Aref et al., "The Handwritten Trie: Indexing Electronic Ink," SIGMOD '95, 1995, pp. 151-162.
Aref et al., "On Handling Electronic Ink", ACM Computing Surveys, vol. 27, No. 4, Dec. 1995, pp. 564-567.
Uchihashi et al., "Automatic Index Creation for Handwritten Notes," IEEE Int. Conf. on Acoustics, Speech, and Signal Processing, vol. 6, Mar. 15, 1999, pp. 3453-3456.
James D. Foley, et al., "Computer Graphics: Principles and Practices", 2ND Edition, 1990, pp. 835-840.
Gerald E. Farin, "Curves and Surfaces for Computer Aided Geometric Design a Practical Guide", 2ND Edition, 1990, pp. 37-41.
Angelfire Webpage, "Curve Fitting and the Method of Least Squares", http://www.angelfire.com/ak4/neurope/is.html, printed Jul. 6, 2001, 13 pages.
John D. Hobby, "Rasterizing Curves of Constant Width", Journal of the Association for Computing Machinery, vol. 36, No. 2, Apr. 1989, pp. 209-229.
aha! InkWriterJ The simplicity of pen and paper, the power of word processing., Advertisement, 1993, 2 pp., aha! software corporation, Mountain View, CA.
aha! InkWriterJ for Magic Cap "The fastest, most convenient way to create faxes, notes and messages." Advertisement, 1993, 1994, 2 pp., aha! software corporation, Mountain View, CA.
aha! 2.0 for Windows InkWriterJ The power of word processing, the convenience of pen and paper, Advertisement, 1994, 1995, 2 pp., aha! software corporation, Mountain View, CA.
aha! software products, Web Page List of Products, Sep. 24, 1997, pp. 1-5, aha! software corporation, Mountain View, CA.
"Adobe Acrobat 3.0 Reader Online Guide", Adobe Systems, Inc., pp. 1-110, 2004.
Open eBook Forum, Open eBook™ Publication Structure 1.0, Sep. 1999 http://www.ebxwg.org/oebps/oebps1.0/download/oeb1-oebps.htm.
Kristensen, A., "Formsheets and the XML Forms Language" (Mar. 1999).
Dublin Core Resource Types: Structurality DRAFT: Jul. 24, 1997, Feb. 27, 1998.
Dublin Core Metadata Element Set, Version 1.1: Reference Description; 1999.
Dublin Core Metadata Initiative: User Guide Working Draft Jul. 31, 1998; 1999.
SOFTBOOK® Press, The Leader in Internet-Enabled Document Distribution and Reading Systems; 1999 http://www.softbook.com/consumer/reader.asp.
Rocket eBook Using the Rocket eBook, 1999; http://www.rocketbook.com/Products/Faq/using.html.
Explore the Features of the Rocket eBook; wysiwyg://212http://www.rocketbook.com/Products/Tour/index.html; publication date unknown, prior to filing application, 2004.
Computer Networks and ISDN Systems "Responsive interaction for a large Web application: the meteror shower architecture in the WebWriter II Editor"; 1997, pp. 1508-1517.
Hirotsu et al., "Cmew/U—A Multimedia Web Annotation Sharing System", NTT Network Innovation Laboratories—Japan, IEEE, 1999, pp. 356-359.
Kuo et al., "A Synchronization Scheme for Multimedia Annotation", Multimedia Information Networking Laboratory, Tamkang University—Taiwan, IEEE, 1997, pp. 594-598.
Quick Time, Inside Macintosh: QuickTime Reference, 1999, http://developer.apple.com/documentation/QuickTime/REF/refVectors.1.htm.
W3C, XML Schema Part 1: Structures, 1999, http://www.w3.org/TR/1999/WD-XMLSCHEMA-1-19991217/.
Hamilton, Eric, JPEG File Interchage Format Version 1.02, Sep. 1, 1992, http://www.w3.org/Graphics/JPEG/jfif3.pdf.
Baxes, Gregory A., Digital Image Processing, 1994, John Wiley & Sons, Inc. ISBN 0-471-00949-0.
J.E. Warnock and D.K. Wyatt, "A Device Independent Graphics Imiaging Model for Use with Raster Devices", Compauter Graphics, 16, 3, 313-319 (1982).
Adobe Systems Incorporated, "PostScript Language Reference", 3rd Edition, 1999, ISBN 0-201-37922-8.
Microsoft Windows Graphical Environment for Pen Computing—Introduction to Microsoft Windows for Pen Computing, pp. 1-13, date unknown, 2004.
International Search Report, 2004.
Kunikazu, T., Patent Abstracts of Japan, Publication No. 11327789 for Color Display and Electronic Blackboard System, published Nov. 30, 1999.
Franklin, .M. and Peters, .M., Device-Independent Bitmap Sizing, Mar. 1990, IBM Technical Disclosure Bulletin, vol. 32, No. 10A, p. 169.
Anderson, Andrew, The Routing Table, Mar. 1996, <http://www.tidp.org/LDP/nag/node31.html>.
Answers.com Data Structure [Retrieved: Jan. 11, 2001] [Online] URL: http//www.answers.com/topic/data-structure.

* cited by examiner

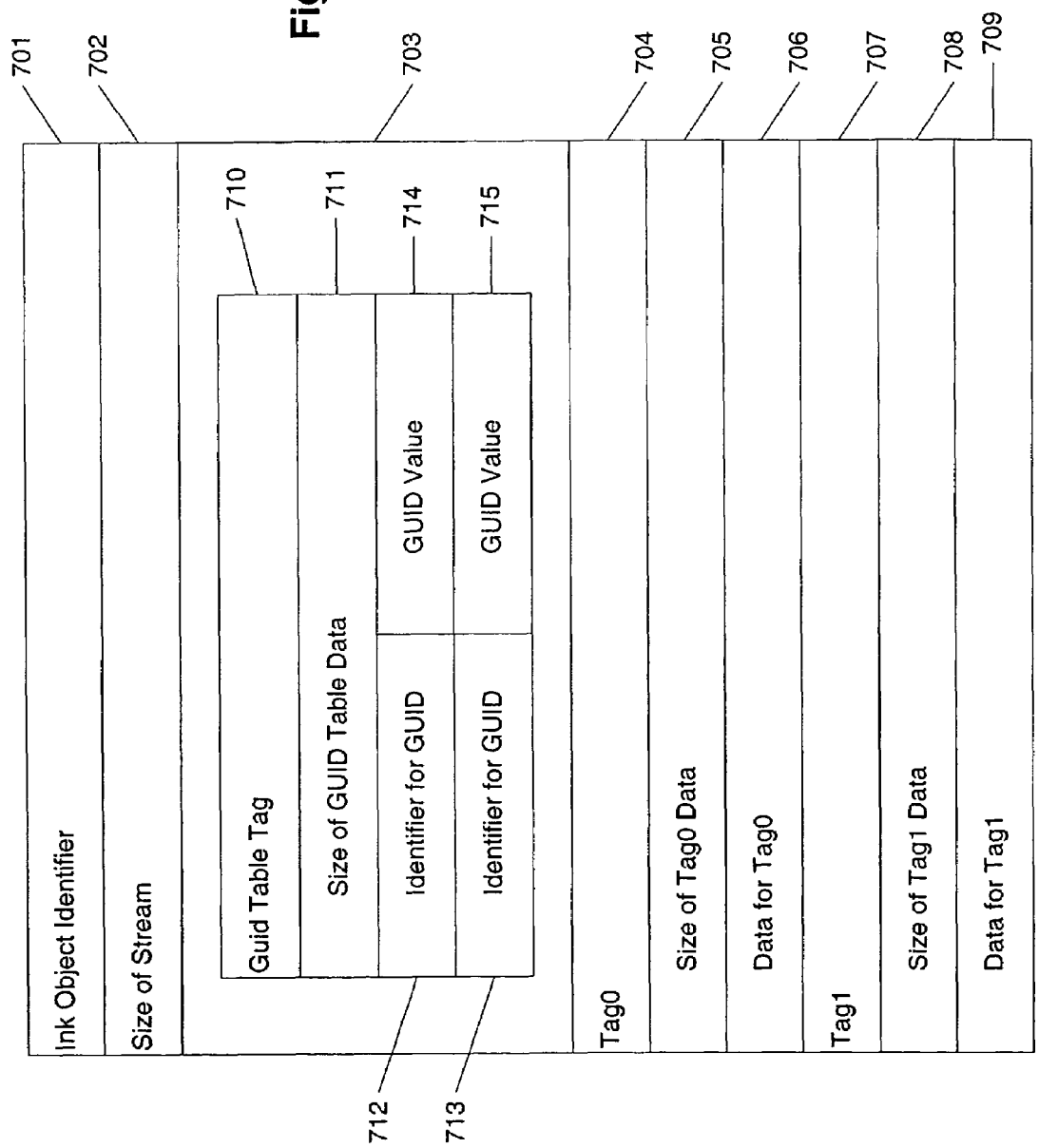

Figure 15

| 1501 |
|---|
| Ink Object Identifier |
| Size/Count of the Rest of the Object |
| Stroke Descriptor Table Tag |
|   Size of Table Having Two Blocks |
|   Size=1 (for the first block) |
|     Normal Pressure Tag |
|   Size=0 (for the second block) |
| Metrics Block Tag |
|   Size/Count of the Metric Block |
|   Normal Pressure Tag |
|     Size/count for Normal Pressure Block |
|     Min Pressure {-10} |
|       {10} |
|     Max Pressure {-90} |
|       {90} |
|     Precision {-1} |
|       {1} |
|     Units {-2} |
|       {2} |
| Stroke Tag |
|   Size/count of the stroke and related strokes |
|   Number of points in stroke |
|   X data |
|   Y data |
|   Pressure data |
| Stroke Descriptor Table Index Tag |
|   1 |
| Stroke Tag |
|   Size/count of the stroke and related stroke properties |
|   Number of points in stroke |
|   X data |
|   Y data |
| Stroke Tag |
|   Size/count of the stroke and related stroke properties |
|   Number of points in stroke |
|   X data |
|   Y data |

SERIAL STORAGE OF INK AND ITS PROPERTIES

CROSS-REFERENCE TO RELATED APPLICATIONS

This application is a divisional of prior U.S. application Ser. No. 09/852,799, filed May 11, 2001 which is related to U.S. application Ser. No. 60/212,825, entitled "Methods for Classifying, Anchoring, and Transforming Ink Annotations", filed Jun. 21, 2000, and to U.S. application Ser. No. 09/750,288, entitled "Classifying, Anchoring, and Transforming Ink", filed Dec. 29, 2000, whose contents are expressly incorporated herein by reference as to their entireties.

FIELD OF THE INVENTION

Aspects of the present invention are directed generally to apparatus and methods for controlling a graphical user interface (GUI). More particularly, aspects of the present invention relate to capturing and/or storing electronic ink.

BACKGROUND OF THE INVENTION

Typical computer systems, especially computer systems using graphical user interface (GUI) systems such as Microsoft WINDOWS, are optimized for accepting user input from one or more discrete input devices such as a keyboard for entering text, and a pointing device such as a mouse with one or more buttons for driving the user interface. The ubiquitous keyboard and mouse interface provides for fast creation and modification of documents, spreadsheets, database fields, drawings, photos and the like. However, there is a significant gap in the flexibility provided by the keyboard and mouse interface as compared with the non-computer (i.e., standard) pen and paper. With the standard pen and paper, a user edits a document, writes notes in a margin, and draws pictures and other shapes and the like. In some instances, a user may prefer to use a pen to mark-up a document rather than review the document on-screen because of the ability to freely make notes outside of the confines of the keyboard and mouse interface.

Some computer systems permit a user to draw on a screen. For example, the Microsoft READER application permits one to add electronic ink (also referred to herein as "ink") to a document. The system stores the ink and provides it to a user when requested. Other applications (for example, drawing applications as known in the art are associated with the Palm 3.x and 4.x and PocketPC operating systems) permit the capture and storage of drawings. These drawings include other properties associated with the ink strokes used to make up the drawings. For instance, line width and color may be stored with the ink. One goal of these systems is to replicate the look and feel of physical ink being applied to a piece of paper. However, physical ink on paper may have significant amounts of information not captured by the electronic collection of a coordinates and connecting line segments. Some of this information may include the thickness of the pen tip used (as seen through the width of the physical ink), the shape of the pen tip, the speed at which the ink was deposited, and the like.

Another problem has arisen in the storage of electronic ink. While some applications permit the capture and subsequent rendering of ink, the ink can only be associated with the application in which the ink was captured. Thus, a user loses the portability of the ink. If a second application was to attempt to use the ink stored in conjunction with a first application, the second application will not be able to interpret non-standard properties associated with the ink.

Further, while data structures are known, the size of the data structure used to store information may become excessively large and cumbersome. An example of a data structure that permits the random storage of information is the interchange file format (IFF). While the IFF is a simple structure to compose, any data structure in IFF would be excessively large, as each separate element has to be separately defined. Redundant definitions for similar elements were repeated.

Accordingly, an improved system is needed for storing ink and its associated properties.

SUMMARY OF THE INVENTION

The present invention provides a flexible and efficient system, method, and data structure for receiving, storing, and rendering ink, thereby solving one or more of the problems identified with conventional devices and systems.

Aspects of the present invention are directed to an improved system, method and data structure for storing ink and its associated properties. The properties may be associated with tags.

In some aspects of the invention, a data structure is used having a first portion with an identifier; a second portion with size of tag data; and a third portion having the tag data.

In other aspects of the invention, methods are implemented for creating a data structure for storing ink comprising the steps of receiving ink information; determining ink properties; determining which ink properties are global; and creating a data structure with one representation of global for a set of ink strokes.

In further aspects of the invention, methods for using a data structure for storing ink are implemented including identifying a tag; retrieving the size of the data associated with the tag; and, if an application can use tag, then reading the data associated with the tag, otherwise skipping the tag by skipping past the tag data based on the size of the retrieved size of the data associate with the tag.

In further aspects of the invention, a system creates a data structure including an input receiving ink strokes; a processor parsing the received ink strokes and determining properties associated with the ink strokes; and a storage storing the ink strokes in a tagged data format.

In still further aspects of the invention, a system uses a data structure having a storage storing ink strokes in a tagged data format; and a processor retrieving the ink strokes and processing at least some of the tags associated with the ink strokes.

These and other features and aspects of the invention will be apparent upon consideration of the following detailed description of the preferred embodiments.

BRIEF DESCRIPTION OF THE DRAWINGS

The foregoing summary of the invention, as well as the following detailed description of preferred embodiments, is better understood when read in conjunction with the accompanying drawings, which are included by way of example, and not by way of limitation with regard to the claimed invention.

FIGS. 6A-C show data structures having a GUID table in accordance with embodiments of the present invention.

FIG. 15 shows a detailed example of an ink object having at least one stroke and properties in accordance with embodiments of the present invention.

DETAILED DESCRIPTION OF PREFERRED EMBODIMENTS

Figure 1:
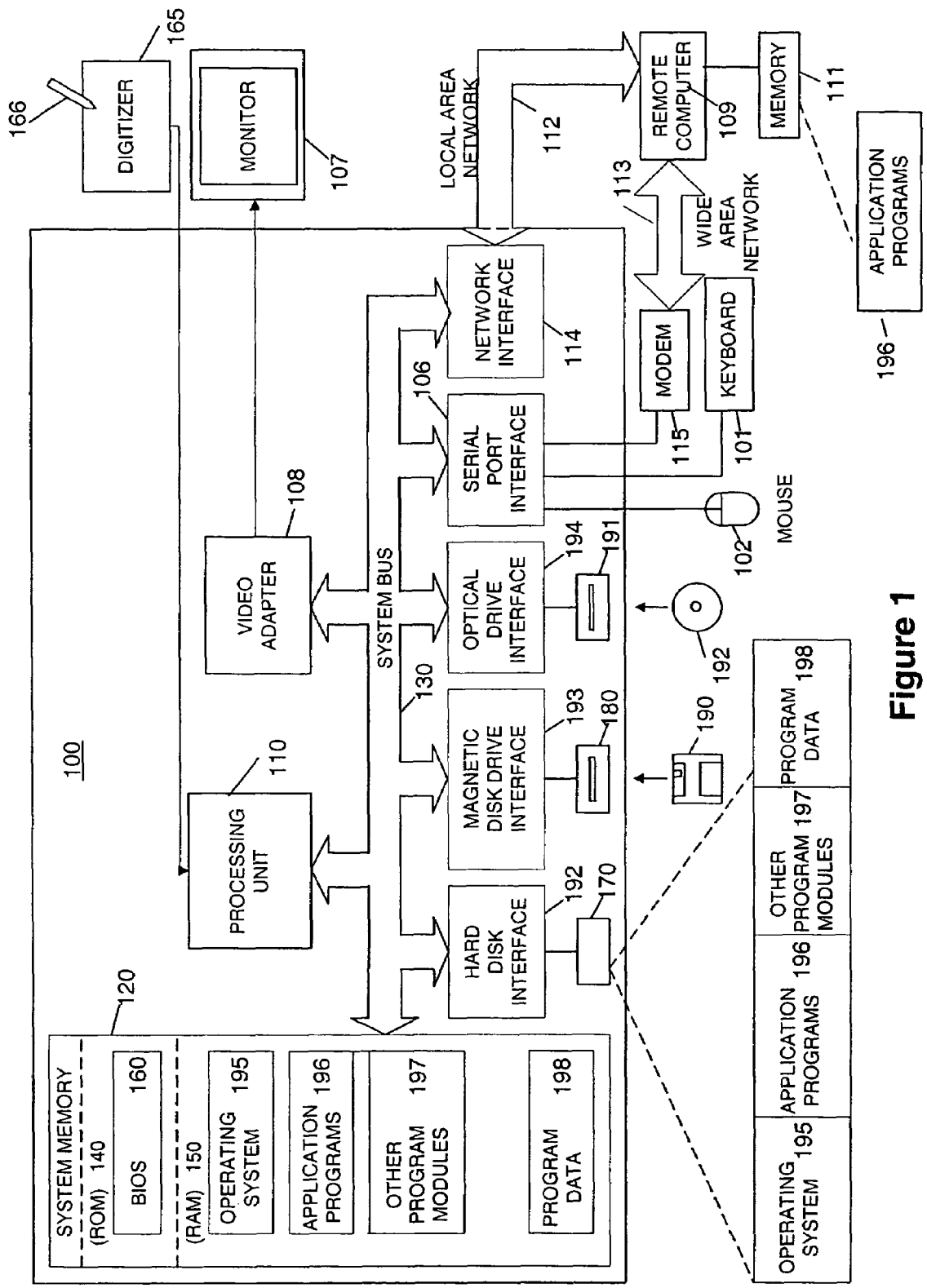
FIG. 1 shows a schematic diagram of a general-purpose digital computing environment that can be used to implement various aspects of the invention.

The following description is divided into sub-sections to assist the reader. The sub-sections include: characteristics and storage of ink; terms; general purpose computer and associated hardware; an example of strokes of ink; common stream items; a complex example; encoding of values; and a summarization of the storage of ink.

Characteristics and Storage of Ink

The present invention relates to the storage of electronic ink and/or properties or other data associated with electronic ink. Ink as used herein refers to electronic ink. Ink refers to a sequence of strokes, where each stroke is comprised of a sequence of points. The points may be represented using a variety of known techniques including Cartesian coordinates (X, Y), polar coordinates (r, Θ), and other techniques as known in the art.

As known to users who use ink pens, physical ink (the kind laid down on paper using a pen with an ink reservoir) may convey more information than a series of coordinates connected by line segments. For example, physical ink can reflect pen pressure (by the thickness of the ink), pen angle (by the shape of the line or curve segments and the behavior of the ink around discreet points), and the speed of the nib of the pen (by the straightness, line width, and line width changes over the course of a line or curve).

To provide the look and feel of physical ink, the exemplary disclosed system and method store ink strokes and properties associated with the ink strokes to more fully render ink. In some embodiments, ink may be stored as a series or set of strokes and a series or set of properties. In other embodiments, ink may be stored with a complex series of properties in which the properties have properties of their own. Properties of the ink may include, for example, color, width, pressure between the stylus and tablet, and angle between the stylus and tablet, and pen shape and the like. While these properties may suffice for many applications, embodiments of the present invention provide for the extensible storage of custom properties (and other data) generated by applications. All strokes and values may be stored directly with excess information. However, alternative embodiments reflect considerations that eliminate excess information when possible or practicable.

The properties used to define an ink object and the strokes within the ink object may have varying scope. For example, some properties may apply to all ink strokes in an ink object (e.g., the shape of a pen tip). Other properties may relate only to a specific point (e.g., a point at which a stylus starts a stroke). Others may relate to specific strokes while others may relate to packets of information as reported by hardware (e.g., coordinates, pressure, angle of pen, the intervals of time between reported coordinates, and the like). In short, properties have different levels of scope.

To efficiently store properties, some may be explicitly specified while others may be implicit. In a simple example, all properties may be default properties and not specified in an ink object. So, the ink object may only have X and Y coordinate values. In another example, the ink object may have properties that affect the entire ink object but the properties are specified in the ink object. In a third example, some strokes may have a first set of properties and others have a second set of properties. The properties may be defined initially at the beginning of the ink object and the individual strokes may reference the previously defined properties as needed. Using this approach of defining properties then later referencing the properties promotes a greater efficiency in storing properties. This becomes more apparent as an ink object becomes larger as the number of properties increases and the number of ink strokes referencing the properties increases.

Terms

Ink—A sequence or set of strokes with properties. A sequence of strokes may include strokes in an ordered form. The sequence may be ordered by the time captured or by where the strokes appear on a page. Other orders are possible. A set of strokes may includes sequences of strokes or unordered strokes or any combination thereof Stream—A sequence of strokes that may or may not include properties that comprises a data structure.

Ink object—A data structure storing a stream with or without properties.

Stroke—A sequence or set of captured points. For example, when rendered, the sequence of points may be connected with lines. Alternatively, the stroke may be represented as a point and a vector in the direction of the next point. In short, a stroke is intended to encompass any representation of points or segments relating to ink, irrespective of the underlying representation of points and/or what connects the points.

Point—Information defining a location in space. For example, the points may be defined relative to a capturing space (for example, points on a digitizer), a virtual ink space (the coordinates in a space into which captured ink is placed), and/or display space (the points or pixels of a display device).

Virtual Ink Space—A framework to which all ink strokes relate. The framework may include a two or three-dimensional shape. In one example, the framework may include a unit size square. In another example, the framework may include a defined rectangle. While some ink strokes may extend outside of the framework, the framework may be used for rendering purposes including dimensioning for a printer or a display. In one aspect, the framework is a norm to which ink strokes may be spatially defined.

Global Ink Properties—These are properties that apply to a stroke or set of strokes unless otherwise defined. For example, a selected ink color may be blue. By setting all strokes to blue, the default color of the strokes would be blue.

Local Ink Properties—These are properties that apply to a specific stroke (or data point or data points). For example, while a global ink property may be blue, a specific stroke may be set to red. Some local ink properties may be interpreted, in some cases, as global properties as they affect subsequently encountered strokes in an ink object.

Render—The process of determining how graphics (and/or ink) is to be displayed, whether on a screen or printed, or output into another file format.

GUID—A Global Unique Identifier is a term well known in the art. A GUID is an integer (for example, 64 bit, 128 bit, 256 bit, or the like) that identifies an interface to an object across all computers and networks. A GUID may identify interfaces, replica sets, records, and other objects. Such an identifier is unique with a very low probability of being duplicated. Other definitions are known in the art and are incorporated herein by reference.

General Purpose Computer

FIG. 1 illustrates a schematic diagram of an exemplary conventional general-purpose digital computing environment that can be used to implement various aspects of the present invention. In FIG. 1, a computer 100 includes a processing unit 110, a system memory 120, and a system bus 130 that couples various system components including the system memory to the processing unit 110. The system bus 130 may be any of several types of bus structures including a memory bus or memory controller, a peripheral bus, and a local bus using any of a variety of bus architectures. The system memory 120 includes read only memory (ROM) 140 and random access memory (RAM) 150.

A basic input/output system 160 (BIOS), containing the basic routines that help to transfer information between elements within the computer 100, such as during start-up, is stored in the ROM 140. The computer 100 also includes a hard disk drive 170 for reading from and writing to a hard disk (not shown), a magnetic disk drive 180 for reading from or writing to a removable magnetic disk 190, and an optical disk drive 191 for reading from or writing to a removable optical disk 192 such as a CD ROM or other optical media. The hard disk drive 170, magnetic disk drive 180, and optical disk drive 191 are connected to the system bus 130 by a hard disk drive interface 192, a magnetic disk drive interface 193, and an optical disk drive interface 194, respectively. The drives and their associated computer-readable media provide nonvolatile storage of computer readable instructions, data structures, program modules and other data for the personal computer 100. It will be appreciated by those skilled in the art that other types of computer readable media that can store data that is accessible by a computer, such as magnetic cassettes, flash memory cards, digital video disks, Bernoulli cartridges, random access memories (RAMs), read only memories (ROMs), and the like, may also be used in the example operating environment.

A number of program modules can be stored on the hard disk drive 170, magnetic disk 190, optical disk 192, ROM 140 or RAM 150, including an operating system 195, one or more application programs 196, other program modules 197, and program data 198. A user can enter commands and information into the computer 100 through input devices such as a keyboard 101 and pointing device 102. Other input devices (not shown) may include a microphone, joystick, game pad, satellite dish, scanner or the like. These and other input devices are often connected to the processing unit 110 through a serial port interface 106 that is coupled to the system bus, but may be connected by other interfaces, such as a parallel port, game port or a universal serial bus (USB). Further still, these devices may be coupled directly to the system bus 130 via an appropriate interface (not shown). A monitor 107 or other type of display device is also connected to the system bus 130 via an interface, such as a video adapter 108. In addition to the monitor, personal computers typically include other peripheral output devices (not shown), such as speakers and printers. In a preferred embodiment, a pen digitizer 165 and accompanying pen or stylus 166 are provided in order to digitally capture freehand input. Although a direct connection between the pen digitizer 165 and the processing unit 110 is shown, in practice, the pen digitizer 165 may be coupled to the processing unit 110 via a serial port, parallel port or other interface and the system bus 130 as known in the art. Furthermore, although the digitizer 165 is shown apart from the monitor 107, it is preferred that the usable input area of the digitizer 165 be co-extensive with the display area of the monitor 107. Further still, the digitizer 165 may be integrated in the monitor 107, or may exist as a separate device overlaying or otherwise appended to the monitor 107.

The computer 100 can operate in a networked environment using logical connections to one or more remote computers, such as a remote computer 109. The remote computer 109 can be a server, a router, a network PC, a peer device or other common network node, and typically includes many or all of the elements described above relative to the computer 100, although only a memory storage device 111 has been illustrated in FIG. 1. The logical connections depicted in FIG. 1 include a local area network (LAN) 112 and a wide area network (WAN) 113. Such networking environments are commonplace in offices, enterprise-wide computer networks, intranets and the Internet.

When used in a LAN networking environment, the computer 100 is connected to the local network 112 through a network interface or adapter 114. When used in a WAN networking environment, the personal computer 100 typically includes a modem 115 or other means for establishing a communications over the wide area network 113, such as the Internet. The modem 115, which may be internal or external, is connected to the system bus 130 via the serial port interface 106. In a networked environment, program modules depicted relative to the personal computer 100, or portions thereof, may be stored in the remote memory storage device.

It will be appreciated that the network connections shown are exemplary and other techniques for establishing a communications link between the computers can be used. The existence of any of various well-known protocols such as TCP/IP, Ethernet, FTP, HTTP and the like is presumed, and the system can be operated in a client-server configuration to permit a user to retrieve web pages from a web-based server. Any of various conventional web browsers can be used to display and manipulate data on web pages.

Figure 2:
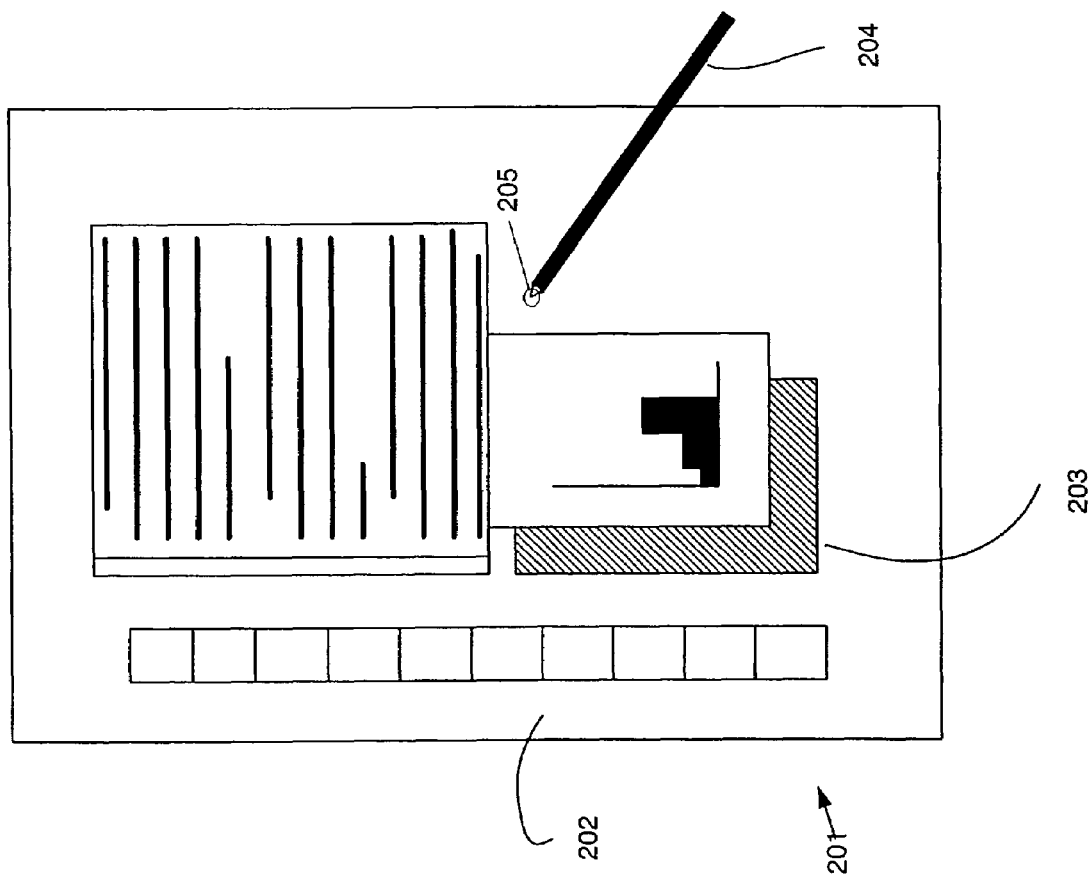
FIG. 2 shows a plan view of a tablet computer and stylus that can be used in accordance with various aspects of the present invention.

FIG. 2 illustrates an exemplary tablet PC 201 that can be used in accordance with various aspects of the present invention. Any or all of the features, subsystems, and functions in the system of FIG. 1 can be included in the computer of FIG. 2. Tablet PC 201 includes a large display surface 202, e.g., a digitizing flat panel display, preferably, a liquid crystal display (LCD) screen, on which a plurality of windows 203 is displayed. Using stylus 204, a user can select, highlight, and/or write on the digitizing display surface 202. Examples of suitable digitizing display surfaces 202 include electromagnetic pen digitizers, such as Mutoh or Wacom pen digitizers. Other types of pen digitizers, e.g., optical digitizers, may also be used. Tablet PC 201 interprets gestures made using stylus 204 in order to manipulate data, enter text, create drawings, and/or execute conventional computer application tasks such as spreadsheets, word processing programs, and the like.

The stylus 204 may be equipped with one or more buttons or other features to augment its selection capabilities. In one embodiment, the stylus 204 could be implemented as a "pencil" or "pen", in which one end constitutes a writing portion and the other end constitutes an "eraser" end, and which, when moved across the display, indicates portions of the display are to be erased. Other types of input devices, such as a mouse, trackball, or the like could be used. Additionally, a user's own finger could be the stylus 204 and used for selecting or indicating portions of the displayed image on a touch-sensitive or proximity-sensitive display. Consequently, the term "user input device", as used herein, is intended to have a broad definition and encompasses many variations on well-known input devices such as stylus 204. Region 205 shows a feedback region or contact region permitting the user to determine where the stylus 204 as contacted the display surface 202.

In various embodiments, the system provides an ink platform as a set of COM (component object model) services that an application can use to capture, manipulate, and store ink. One service enables an application to read and write ink using the disclosed representations of ink. The ink platform may also include a mark-up language including a language like the extensible markup language (XML). Further, the system may use DCOM as another implementation.

An Example of Strokes of Ink

Figure 16:
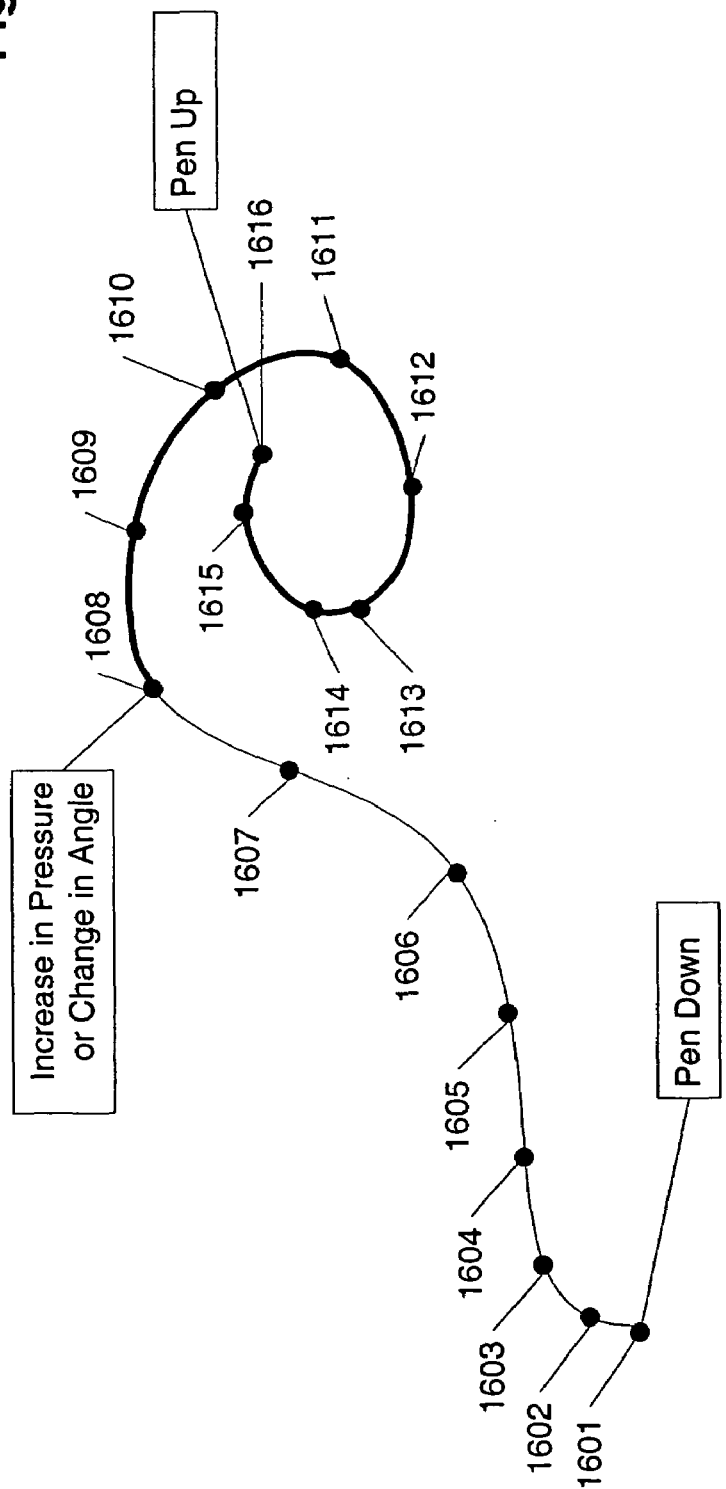
FIG. 16 shows an example of a stroke of ink having points and properties in accordance with the present invention.

An exemplary ink object is shown in FIG. 16. The ink object starts at point 1601 where a pen down action occurred. The pen down action may be stylus 204 contacting the display surface 202, the click of a mouse button, the operation of a button on a trackball or joystick, or the like. The user controls an input (such as stylus 204) device and the resulting stroke continues through points 1602-1616. At point 1616, a pen up action occurred. The pen up action may be the lifting of the stylus 204 off the display surface 204, releasing or another operation of a mouse button, or the operation of the button (or other buttons) on the trackball or joystick or the like. Here, a pen up action and a pen down action are known in the pen digitizing art.

From points 1601 through 1608, the width of the stroke has a first value. At point 1608, the width of the stroke changes to a second value. This may have been because the user increased the pressure between the stylus 204 tip and the display surface 204, because the angle between the stylus 204 and the tablet changed, because the stylus 204 was rotated and projected a different cross section of the stylus 204's nib, or the like. The stroke then continues through point 1616 with the second stroke width. In an alternate embodiment, a user started the stroke with a first line width and selected a different line width at point 1608 to complete the stroke. In a further embodiment, two strokes may form the ink object as shown in FIG. 16. For example, a first stroke may include points 1601-1608 and a second stroke may include points 1608-1616.

Next, the ink object is stored. The ink object stroke may be stored as a single stroke with varying line widths. Alternatively, the ink object may be stored as two or more strokes in which each stroke has its own set of properties. Third, the ink object may be stored as short strokes between points.

Figure 3:
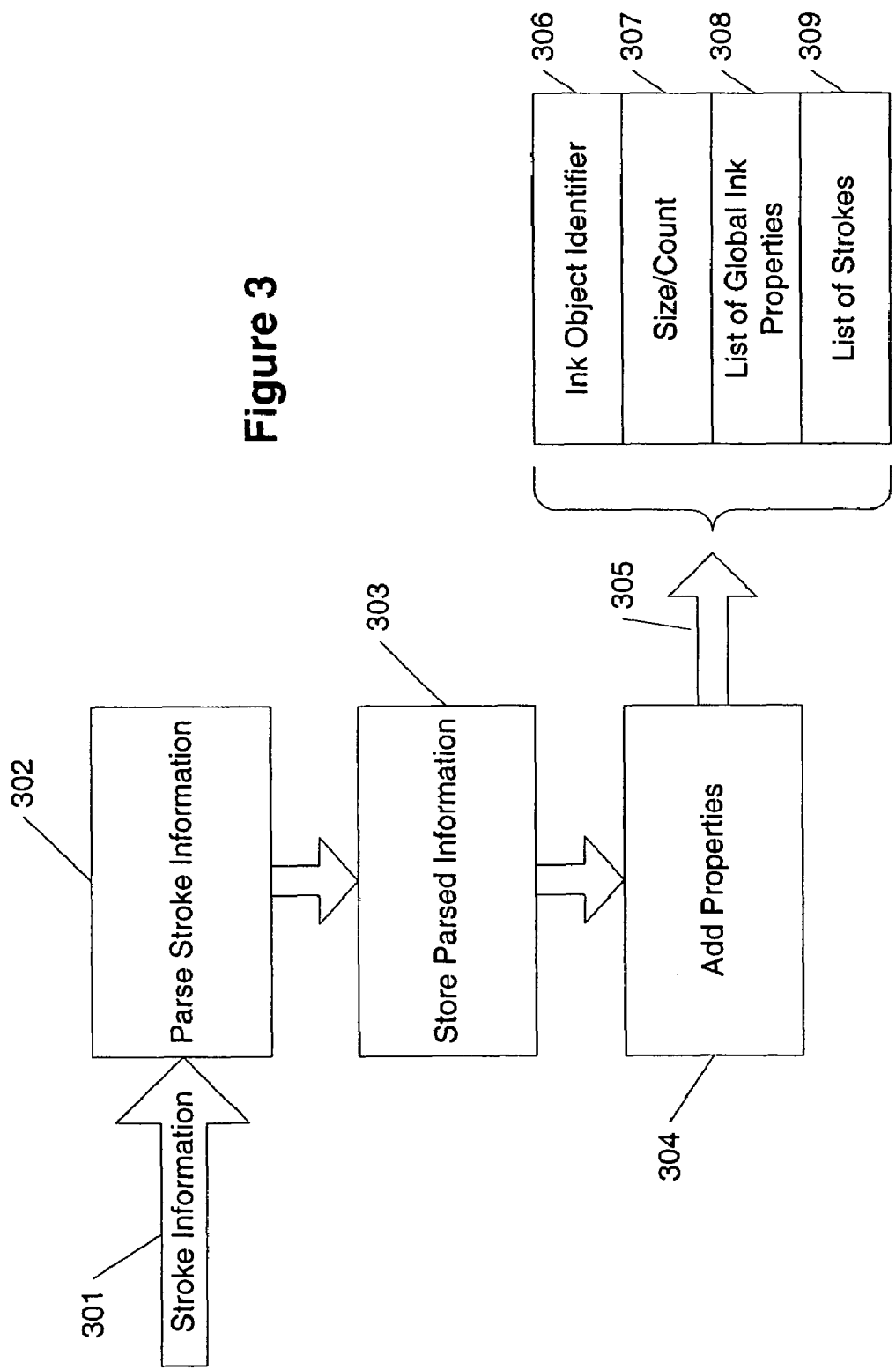
FIG. 3 shows a flowchart showing a process for storing ink strokes in accordance with embodiments of the present invention.

FIG. 3 shows an exemplary method for storing the various strokes of FIG. 16. First, in step 301, stroke information is received. This information may come from a display surface 202 or any other source that is capable of generating strokes. Next, in step 302, the system 201 parses the stroke information 302. The system may parse a number of items including, for example, pressure information, stylus 204 tilt information, position information and the like. The parsed information is temporarily stored in step 303, properties added in step 304 (for example, global and/or local properties) and stored in step 305 in a data structure.

The data structure may contain an identifier 306 that indicates that the following structure is an ink object, size of the remaining sets of data 307 (or count of the properties, strokes, sub-objects and the like present in the data structure), a list of global ink properties 308 that apply as the default properties for contained strokes, and/or a list of strokes 309. Additional information is described with respect to FIG. 4.

Figure 4:
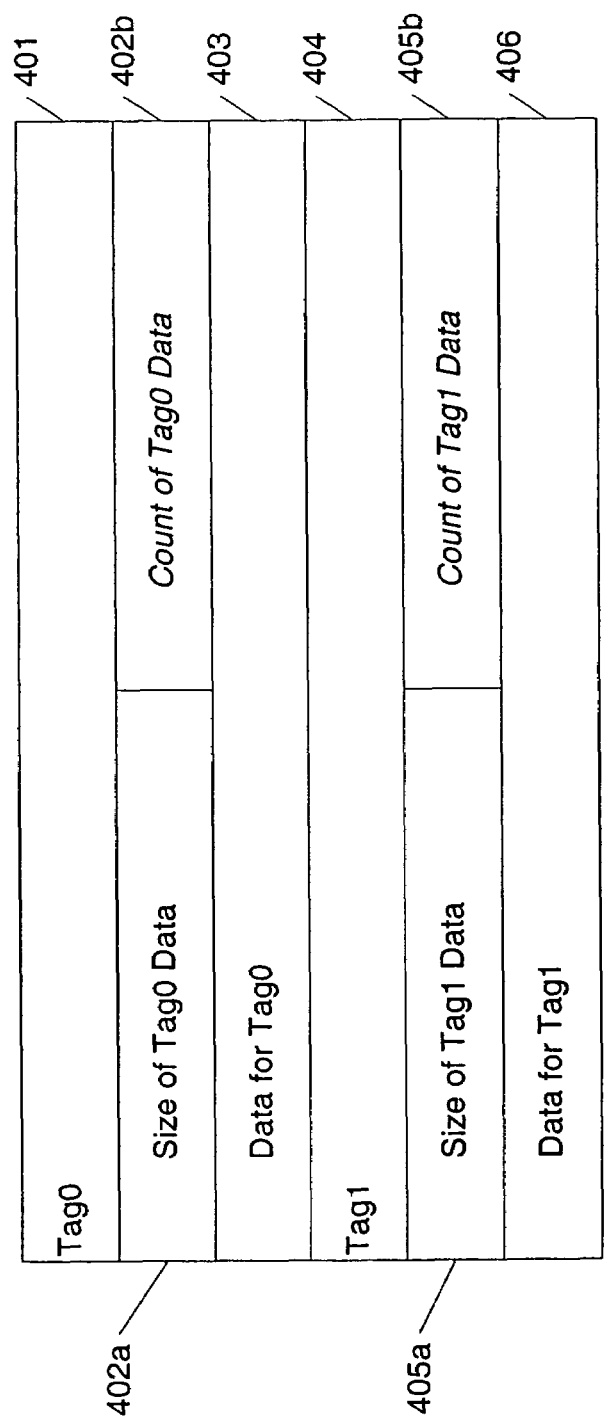
FIG. 4 shows a general data structure for storing ink and or properties associated with ink in accordance with embodiments of the present invention.

FIG. 4 shows a basic exemplary structure in which an identifier is followed by data relating to the identifier. Here, the identifier is generally referred to as a tag (or TAG or Tag). A "Tagged" structure, as shown in FIG. 4, begins with an identifying "tag" followed by a "size field" followed by data. The "tag" identifies the contents of the data while the "size field" identifies, for example, the size of the data in bytes (or bits and the like). The tag may be either a predefined tag or an application-specific custom tag. In alternate embodiments, the size of the tagged field may appear prior to the tag itself. Benefits of this arrangement are described in relation to FIG. 18.

The structure as shown in FIG. 4 may also include a count of the number of objects, tags, properties, strokes, and the like contained within it. In this regard, the "count" identifier may be used in place of the "size" identifier. If one specifies the size of the rest of the data of the tag, a system may then quickly skip over the rest of the data of the tag if desired. On the other hand, if the count of the number of objects (or properties or the like) was specified, the physical size of the count would likely be smaller than the physical size of the remaining data. In this regard, the ink object would be smaller if a count of remaining objects (or the like) was used rather than a size of the remaining data. However, to skip over the remaining part of an ink object or property, one may need to enumerate all of the sub-objects (or sub-tags or sub-properties) contained within the object or tag. To enumerate these sub-parts, a system may need to perform additional calculations to obtain the number of sub-parts. Further, a system may need to perform additional steps on the skipping operation (for example, advancing past the present object or tag or property) by counting the sub-parts in a count-based data structure, rather than advancing to a new position as used in a size-based system.

Referring to FIG. 4, Tag0 401 is an identifier that denotes that data relating to a first tag will follow. The size of the data associated with Tag0 appears in the next portion 402a. Alternatively, the count of the remaining items in Tag0 may be specified in portion 402b. The data itself for Tag0 appears in portion 403. Similarly, Tag1 404 indicates that data following the Tag1 404 will relate to Tag1 404. Here, portion 405a indicates the size of the data of Tag1 406. Alternatively, portion 405b indicates the number of objects (or sub-tags or sub-properties or the like) in the data of Tag1 406. Next, the data for Tag1 406 follows. One benefit of placing the size after the tag itself is that applications that do not recognize the tag may know, by reading the next portion of information (the size block 402 or 405), the length of data needed to skip over to arrive at the next tag or end of the ink data structure. If a further embodiment, both portions 402a and 402b (as well as 405a and 405b) may appear in the same data structure.

As to the specification of size of following data or the count of items in following data, it is appreciated that one may use either of the two ways of specifying information. For simplicity, the following description includes the use of size information. In some instances, count information is also shown. However, where only size information is shown, count information may readily be specified in place of or in addition to the size information.

Figure 6A:
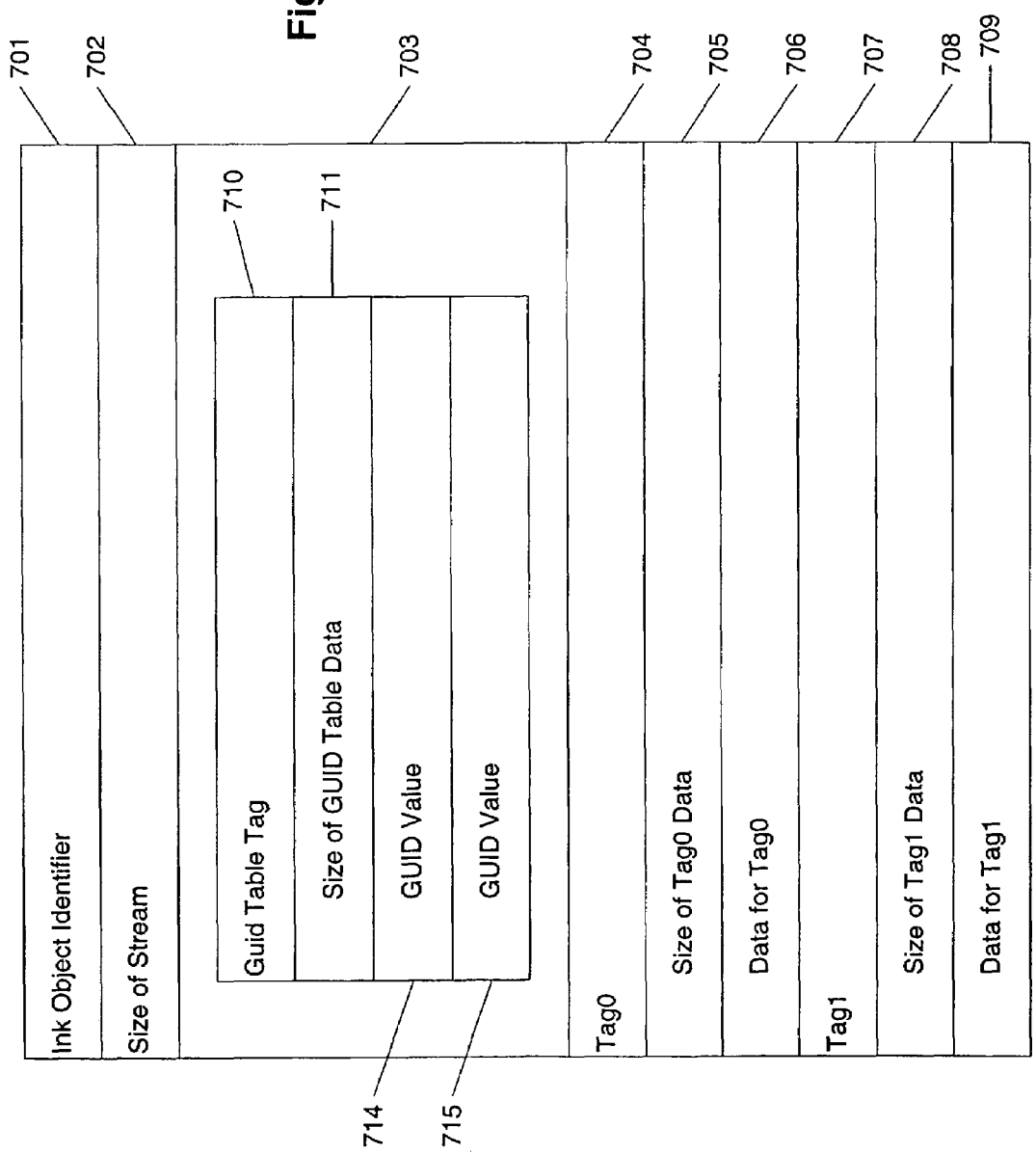
Figure 6C:
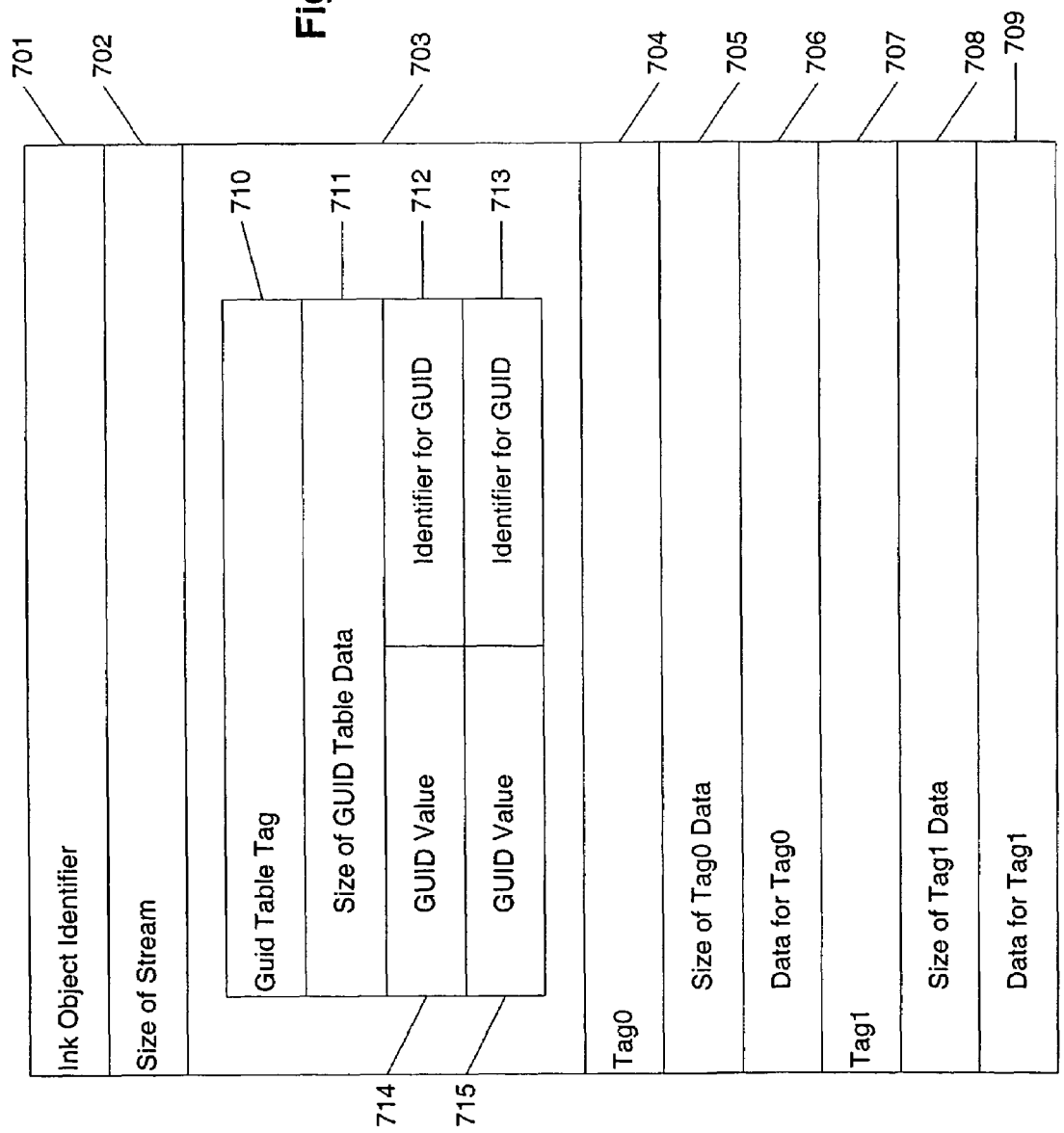

As applied to ink, the tagged data structure of FIG. 4 may be enhanced in a number of ways. In some embodiments, ink strokes may be defined to come in order. In other embodiments, global properties (or properties that may affect all subsequent ink strokes) are provided at a known location for the system. For example, all global properties may be specified at the beginning of the ink object. On the other hand, all global properties may be specified at the end of the ink object. One advantage of putting the global properties at the beginning of the ink object is that a system would already know how to handle a stroke that referenced global properties once it encounters the stroke (as it would have already encountered the global properties section of the ink object). In yet more embodiments, custom properties may be defined through various tables. FIGS. 6A-6C relate to the use of GUID tables and their use in ink objects. The use at least one of these or other enhancements permit properties to be used throughout the ink object and permit a more efficient storage of ink information.

Figure 5:
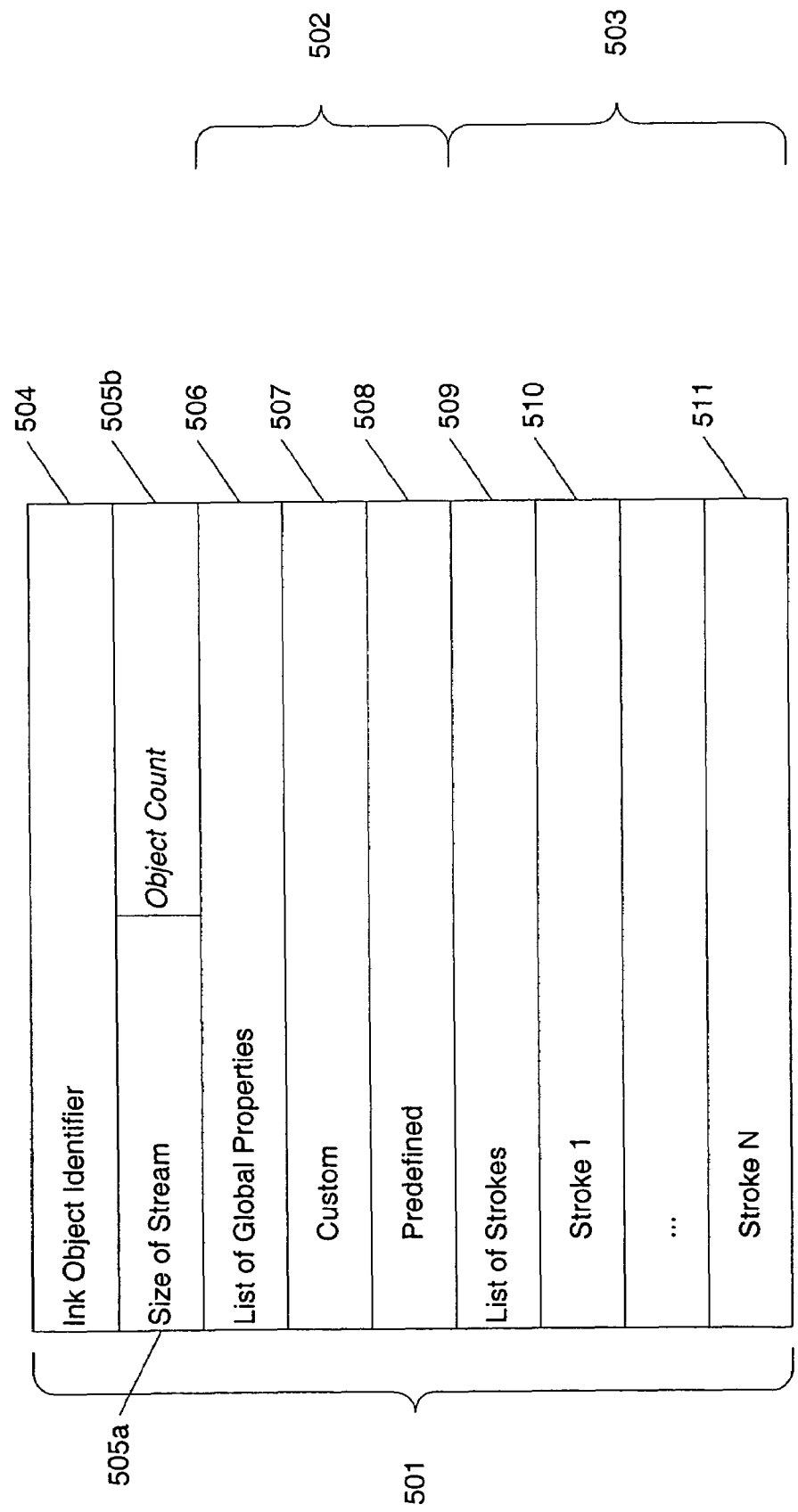
FIG. 5 shows a data structure for storing ink strokes including properties in accordance with embodiments of the present invention.

FIG. 5 shows another example of a data structure 501. FIG. 5 shows an ink object identifier 504 at the beginning of the data structure. The ink object identifier identifies the following data structure as an ink object. The ink object identifier may also include version information that relates to the version of the software used to write the data structure storing the ink object. Following the ink object identifier 504 is a number 505a that indicates the size, in bytes, of all the global ink properties 502 and all the strokes 503. Alternatively, the object count 505b may be specified in place of size 505a. Further, one may use both the size 505a and object counts 505b. The properties are identified with a tag that identifies the global properties 506. Next is a list of some or all the properties, both custom 507 and predefined 508, which apply to the ink as a whole. At the end is a list of strokes 503 (with an identifier or tag 509) identifying the list of strokes 510-511.

The "tag" describing the "data" indicates whether the "data" contains tagged structures or even how many tagged structures. For example, custom properties are considered opaque to the present system since they are application-defined and thus only contain data. However, a stroke may have one or more stroke properties, which are also represented as tagged structures.

In some embodiments, the system attempts to minimize the use of redundant information. In one example, the system takes resources that may apply to multiple strokes, such as a drawing attribute, and only storing it once in the ink stream using a similar table strategy to that described in FIG. 5. For example, a drawing attribute, which describes how a stroke is to be rendered, may be stored in a table. This table is then stored as an ink property that relates to all ink within its object. This means that, unless otherwise defined, the previously defined set of drawing attributes applies to each stroke. Further, if multiple properties are stored in a table (for example, properties specifying different types of pen tips (round, square, rectangle, etc.)) a reference to a desired property is stored with each stroke instead of the whole drawing attribute. A similar approach may be used for other shared resources that may apply to multiple strokes.

The space saving use of references may be used with GUIDs. In the present system, GUIDs may be used to represent the various tags. Using GUIDs assures (for all practical purposes) that the tags will always be unique for all vendors. In one embodiment, GUIDs are used directly. Where the GUID is large, such as 16 bytes in size, it is impractical to use the GUID as the tag since it would make the ink objects extremely large. Instead, some embodiments use an index value as the tag that actually maps into a GUID lookup table.

FIG. 6A shows an example of a GUID look-up table. Here, an ink object identifier 701 and size of the stream 702 are set forth. Next, in portion 703 is a GUID table with GUID table tag 710 and the size of the GUID table data 711. GUIDs 714 and 715 are listed. In FIG. 6A, the identifiers used to reference the GUIDs for Tag0 and Tag1 are not listed. Rather, they are implicit based on predetermined sequence that the first GUID is assigned a first identifier, the second GUID is assigned a second identifier and the like. For example, in FIG. 6A, the identifier "100" may be associated with the first GUID 714 and the identifier "101" may be associated with the second GUID 715. So, when in a property table a reference to GUID 101 is made, the system knows that GUID 715 is intended.

The implicit ordering method of FIG. 6A may be used for all GUIDs. On the other hand, the implicit ordering method of FIG. 6A may be used for all non-predefined GUIDs. So, a number of GUIDs may be predefined with identifiers in the system with all custom GUIDs (or GUIDs above the predefined number) listed separately as shown in FIG. 6A, The predefined identifiers may be those that are often used for GUIDs relating to color, pressure, etc. In some applications, it may be possible that there never is a GUID table in the stream unless the application actually needs custom properties.

The remaining fields 704-709 are similar to that described with respect to FIG. 5. Here, for instance, part of the data of field 706 includes a reference to the GUID table 703 as "100". Because the system knows "100" relates to the GUID 714, the data in field 706 is understood. Similarly, the data for Tag1 in field 709 (preceded by the Tag1 707 identifier and the size of Tag1 data in field 708) may make reference to GUID table 703 with a GUID reference value of "101" (or "100" depending on the GUID to be referenced). Because the system knows what GUIDs relate to what identifiers, the system may process the data of fields 706 and 709 properly.

FIG. 6B shows an alternative representation of the data structure of FIG. 6A. In FIG. 6B, the data structure includes explicit identifiers 712 and 713 for GUIDs 714 and 715, respectively. Using this arrangement, all identifiers for the GUIDs may be explicitly specified. So, if the system has identifiers "100" and "101" predefined for something else, the data structure permits explicit storage of the identifiers (e.g., "507" and "902" to be associated with the GUIDs 714 and 715.

FIG. 6C shows yet another data structure arrangement in which the GUIDs 714 and 715 are specified and the GUID identifiers 712 and 713 follow the GUIDs.

The table sets forth relations between identifiers for Tag0 712 and Tag1 713 and the GUID value for Tag0 714 and the GUID value for Tag1 715.

The GUID lookup table 703 may be stored in the serialized stream as an ink property. This means that each GUID does not need to be repeated in each property of each stroke. Rather, actual tags in the serialized stream identifying a GUID can be a small integer index. Very little space is wasted on the GUID since it is stored only once in the stream.

Finally, while GUIDs are used to describe the system, it is appreciated that other identification systems may be used to identify the tags as described herein. For example, the GUIDs may be replaced by smaller identifiers, which then reference a GUID table for all ink objects. While one would lose some degree of portability of ink, as the ink objects are no longer completely contained, the size of the ink objects may be decreased.

Figure 7:
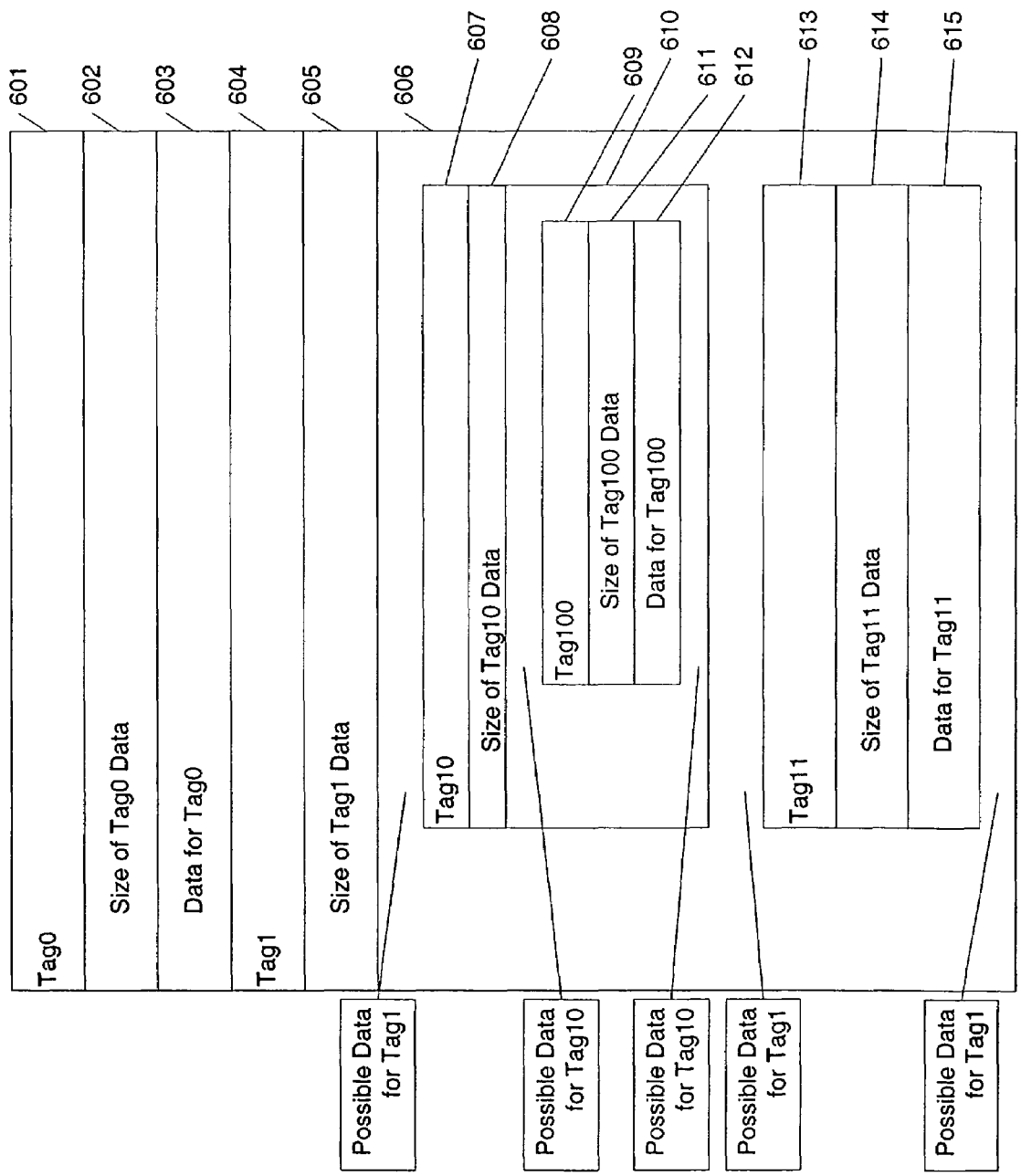
FIG. 7 shows a detailed data structure having nested tags related to ink objects in accordance with embodiments of the present invention.

FIG. 7 shows another example of a tagged data structure used to store ink. In FIG. 7, the tags are nested. In other words, some tags contain other tags. One advantage of nesting tags includes suggesting a relationship by the location and nesting of the tags. Here, Tag0 601 is represented with the size 602 of Tag0 and the data 603 for Tag0. Tag1 604 includes other tags. Field 605 represents the size of the rest of Tag1. Tag10 is nested within Tag1. Field 607 identifies Tag10 and its size is listed in field 608. The data of Tag10 are shown in field 610. Here, Tag10 contains another tag, namely Tag 100, which is identified by field 609, with its size provided in field 611 and its data in field 612. Finally, Tag1 contains Tag11, which is identified by field 613 and has the size of its data in field 614 and the data for Tag11 in field 615. Possible locations for the data of tags Tag1 and Tag10 are as shown in FIG. 7. Thus, multiple levels of properties associated with ink may be stored in an efficient manner.

Figure 8:
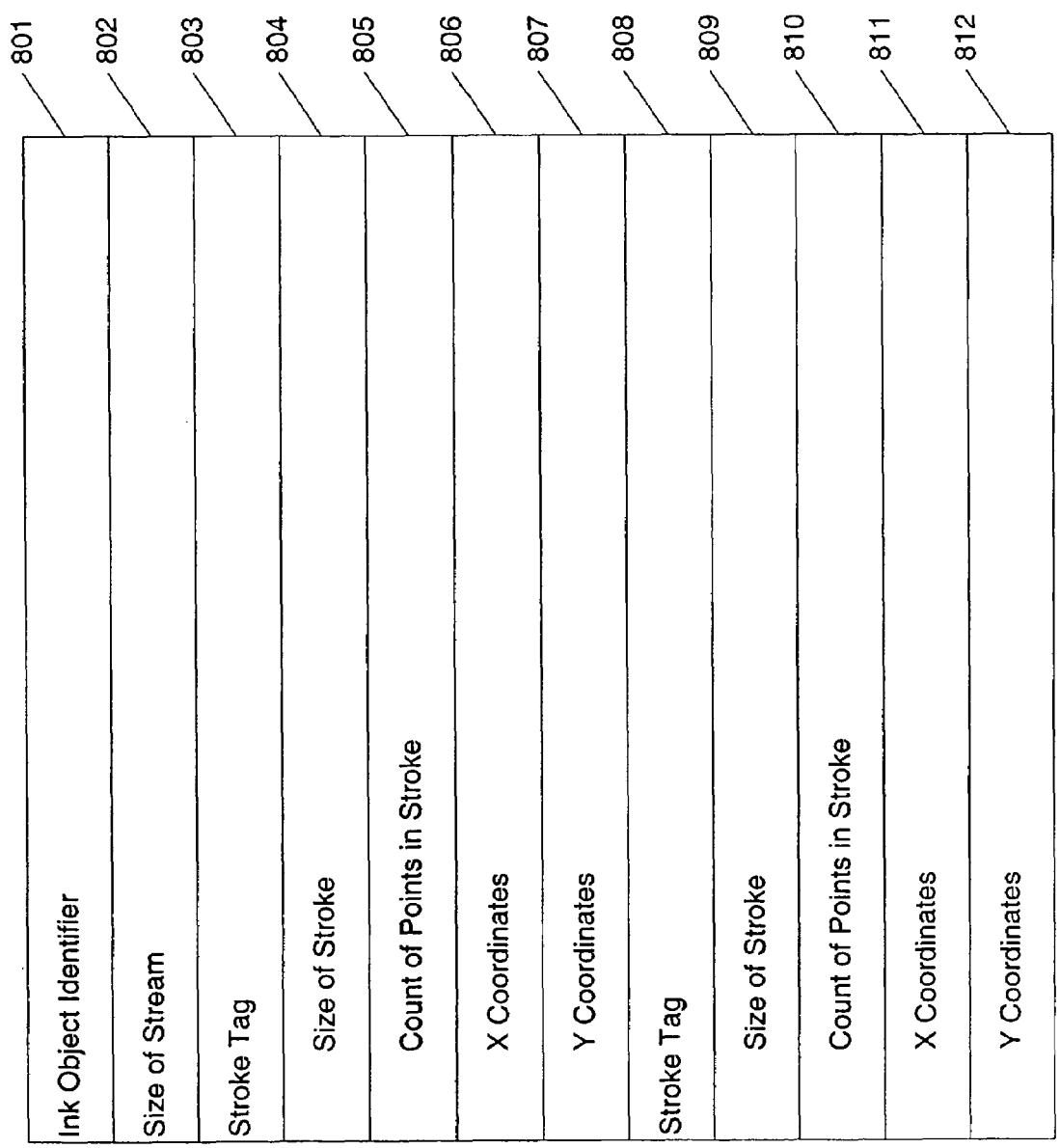
FIG. 8 shows another data structure for storing strokes in accordance with embodiments of the present invention.

In another example, as shown in FIG. 8, multiple strokes may be stored in a stream. FIG. 8 contains only X and Y data in each stroke. The example of FIG. 8 shows ink object identifier 801, size of stream 802, stroke tags 803 and 808, size of stroke blocks 804 and 809, the number of strokes in each stroke 805 and 810, the X coordinates (806 and 811) and the Y coordinates (807 and 812).

Both strokes in the above example are of the simplest form since they contain only the count of points 805 and 810, and the X and Y data for each stroke. The X and Y data may be compressed or uncompressed. Compressing the data saves space, but leaving the data in an uncompressed form generally increases the speed of the storing and rendering processes.

A stroke with no properties may be defined as the default stroke. That is, there are no additional packet properties (such as pressure) associated with each point, or any other per-stroke information in any of the strokes. One implementation would render this ink with the default drawing attributes (black pen, width of one, ball tip, etc.)

The count of bytes used to store the compressed X data or compressed Y data may be stored separately from the disclosed data structure. This is advantageous because given the count in the number of points, the decompression algorithm can just read enough bytes from the stream until it decompresses the number of coordinates, thereby increasing the decompression speed. The first byte of the X and Y data indicates the compression algorithm used, if any.

Common Stream Items

One or more tags may be used to assist in the reduction of redundant data in the in stream. While various tag names are given, it is appreciated that these tag names are for example purposes only.

First, one may use an ink object identifier (see ink object identifier 801 with a version number in FIG. 8) to indicate to alert an application whether it can adequately process the following stream of information. If an application can only process a lower version number, once it reads the higher version number, it will stop processing the stream. When rendering, this may cause the application to retrieve an empty ink object (an ink object with no content) and return an error to the application.

Second, following the ink object identifier may be the size field (see size 802 in FIG. 8) for the stream. The value of this field indicates the size of the stream, such as the total number of bytes following the size field.

A conforming implementation should, in one example, be prepared to accept a size value equal to the largest file size on Windows NT. Presently, this is a 64-bit number but may be larger in the future. In some implementations, such as placing the present system on a limited resource device (e.g., a Windows CE device or a Palm OS device), it may be difficult for an application to process a file of this size. The implementation in that case may generate an appropriate error to the application.

An additional benefit of having the size of the stream actually stored in the stream is that if an application passes a random buffer to the system, then the first two values in the file will usually be zero. This means that the present system will generally immediately stop processing an invalid stream.

Third, global ink properties may be defined to minimize or eliminate redundant information. In simple streams, there may be no global ink properties. However, if there are global ink properties, then it is preferable that they appear before any strokes so that they may apply to all strokes. There are generally eight global ink properties that may be used. Of course, more or less global properties may be defined and used as needed.

The global properties may include one or more of the following:

1) a GUID table;
2) an ink space rectangle;
3) a drawing attribute table;
4) a stroke descriptor table;
5) a transform table;
6) a metric table;
7) a compression header;
8) and custom ink properties.

It is appreciated that the above times may also be included as local properties if nested within other tags.

1) GUID Table

The GUID table, if it appears in the stream, preferably appears immediately after the size field. It is appreciated that the GUID table may appear later or earlier. However, the global application of the GUIDs might a) only apply to items subsequent to the GUID table and/or b) slow down the processing of the ink as previous processed tags may need to be reevaluated after encountering a GUID table.

The GUID table may be identified with the tag 710. In one example, one may use the tag TAG_GUID_TABLE. The size of the table is a multiple of the GUID size, where each entry is a custom GUID as used in the stream.

2) Ink Space Rectangle

An ink space rectangle defines a virtual coordinate space (or virtual ink space) for receiving ink. One tag that may be used includes TAG_INK_SPACE_RECT, which identifies the ink space rectangle when present in the stream. It does not have a size field since it has a fixed number of elements of, for example, four signed numbers. These four numbers represent the left, top, right, and bottom of the ink space. The ink space rectangle defines the virtual coordinate space for the ink. An application may use this rectangle to determine what area of the ink to either display or print. The ink space rectangle essentially defines a virtual sheet of paper that the ink is drawn on. This does not mean that ink may not appear outside this area. However, the application may use this rectangle when deciding how to display the ink according to a given view or on the printer.

3) Drawing Attributes Table

The drawing attributes table may list all drawing attribute sets of properties (also referred to as blocks) in the stream. Each drawing attribute block defines information used while rendering the ink. These blocks may apply to one or more strokes and may be placed in the drawing attributes table so that they are not repeated in each stroke.

An exemplary tag includes TAG_DRAW_ATTRS_TABLE as an identifier. This identifier may be followed by the size of the table. The size of the table may be equal to the sum of the sizes of all drawing attribute blocks.

A drawing attributes table containing only one drawing attributes block is a special case. In one embodiment, the tag and size for the table is omitted and the entire table is replaced by a single drawing attributes block. This reduces information in the drawing attributes table when not needed to define only a single entry.

Figure 9:
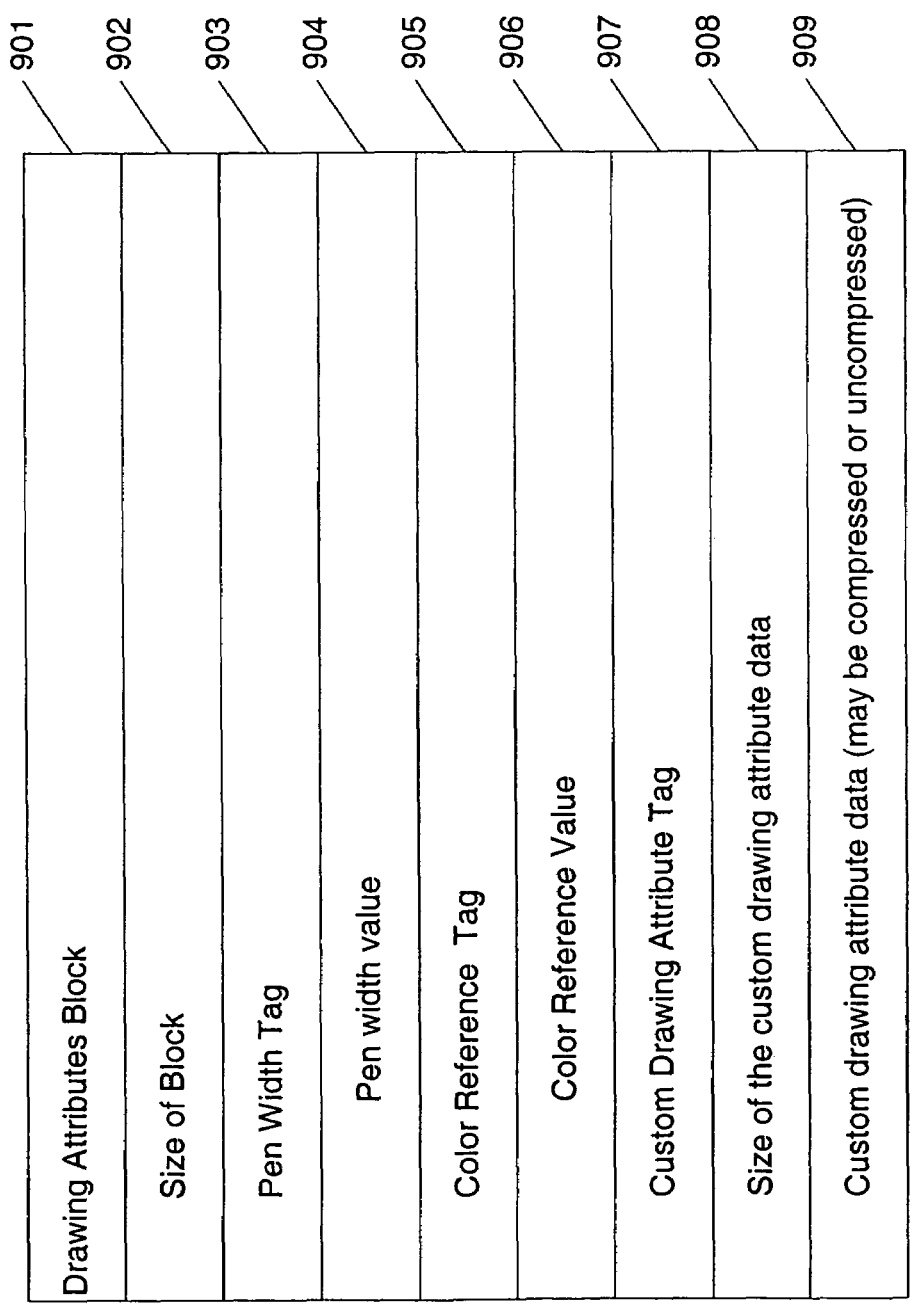
FIG. 9 shows a data structure for storing drawing attributes in accordance with embodiments of the present invention.

FIG. 9 shows a sample drawing attribute block. Each drawing attribute block starts with an identifier. Here, the identifier 901 may be represented as TAG_DRAW_ATTRS_BLOCK. The identifier 901 may be followed by the size 902 of the block. The block may contain a tagged list of drawing attributes. Each entry in the list of drawing attributes may be a pre-defined or custom tag.

FIG. 9 shows a sample pen width tag 903 with its accompanying value 904, a color reference tag 905 and its accompanying value 906, a custom drawing attribute tag 907 with its size 908, and custom drawing attribute data 909.

To save space, the tag for the block may be is omitted when the block appears in a drawing attributes table. This is because the table can only contain blocks and the tag is redundant. The next block may start immediately after the end of the previous block.

Furthermore, all predefined drawing attributes, such as the pen width or color reference, have no size indicator where the data types (e.g., positive integers) are known ahead of time. However, a custom property preferably has a size field since the size of the data is not known ahead of time.

In one embodiment, default and non-default values are stored. Alternatively, another possible space saving optimization is that drawing attributes that are set to the default value are not stored in the attributes block. In the above example, pen tip value is not stored since it is assumed to be the default value. Here, the pen tip may be considered to be a ballpoint pen as represented by the tag PEN_TIP_BALL.

4) Stroke Descriptor Table

The stroke descriptor table lists stroke descriptor blocks in the stream. These blocks may apply to one or more strokes and may be placed in this table so that they are not repeated in each stroke.

An identifier is used to identify the stroke descriptor table. The tag may include TAG_STROKE_DESC_TABLE. The size of the table may follow the size of the table. The size of the table may be equal to the sum of the sizes of all stroke descriptor blocks.

The system may have multiple levels of blocks even if there is only one block for a table. On the other hand, a stroke descriptor table containing only one, single level, stroke descriptor block may be considered a special case. In this regard, the tag and size for the table is omitted and a single stroke descriptor block may be used to replace the entire table. In short, a table may contain multiple blocks except when there would only be one block to table. Here, the ink object may only include the stroke descriptor block.

A stroke may contain arrays of data where each array element corresponds to a property of a point. FIG. 8 shows only X and Y data since there was no stroke descriptor block in the stream. However, an application may attempt to store other properties, such as pressure. An application may simply create a custom stroke property (described later) to store pressure. Unfortunately, no other application would know how to interpret this data and the tag and size of the custom property would be stored in each stroke, thus wasting space in the data structure.

In this event, the stroke descriptor block may be used to solve this problem by defining the data types and their order in the stroke. The system may then use an index to associate a stroke with a particular stroke descriptor block.

Typically, all strokes in an ink stream will use the same stroke descriptor block. However, a stroke descriptor table that contains only one block is rare. However, the system allows different strokes to contain different sets of data by placing the blocks in a table.

Figure 10:
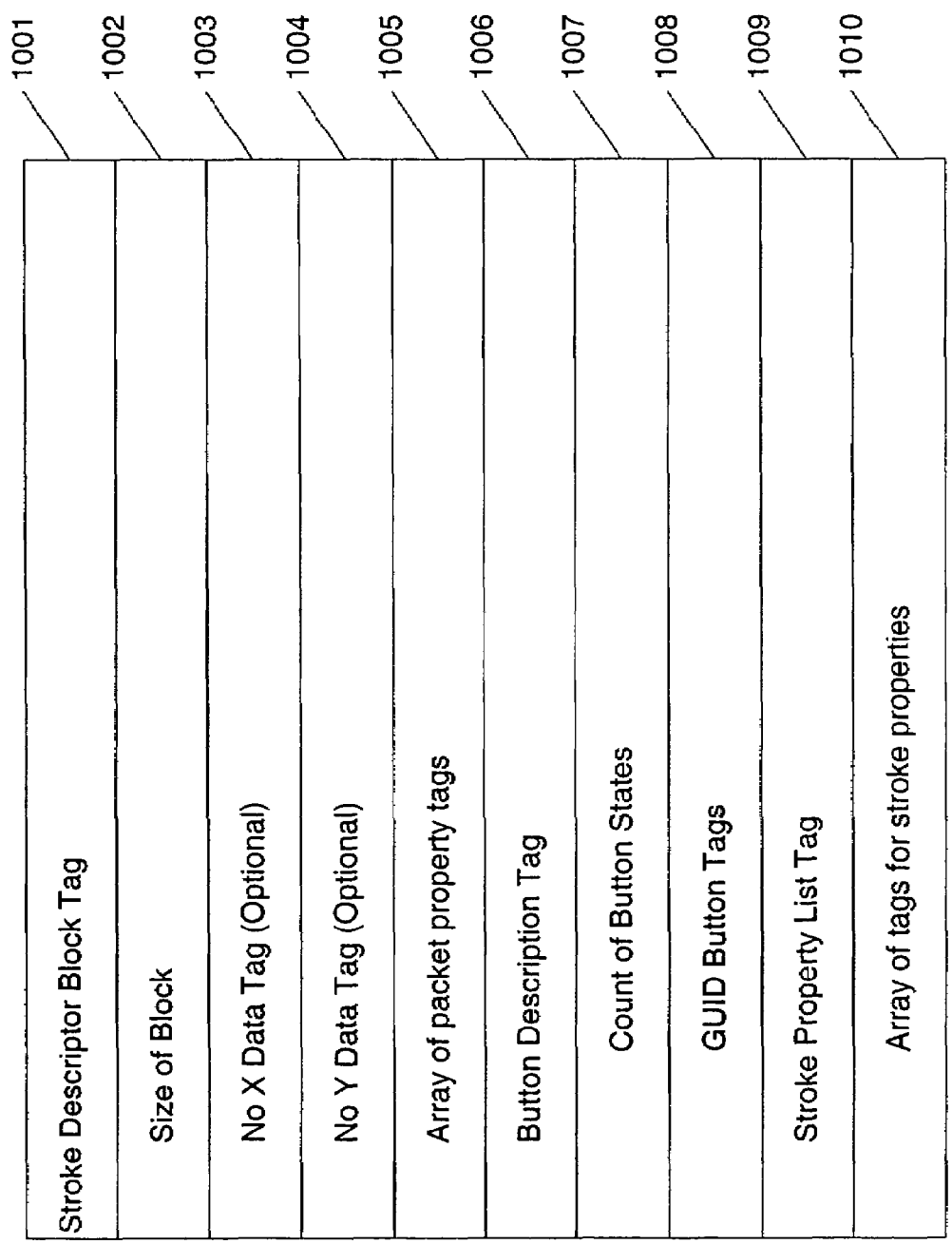
FIG. 10 shows data structure for storing stroke descriptors in accordance with embodiments of the present invention.
Figure 11:
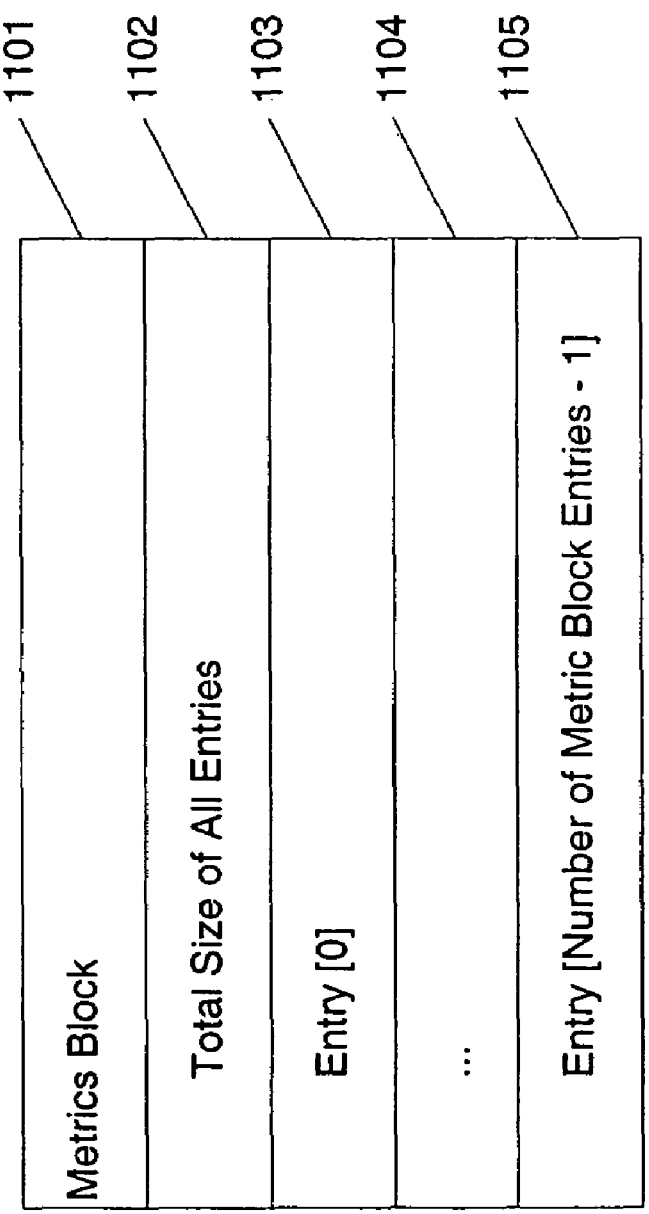
FIG. 11 shows a data structure for metrics for ink in accordance with embodiments of the present invention.
Figure 12:
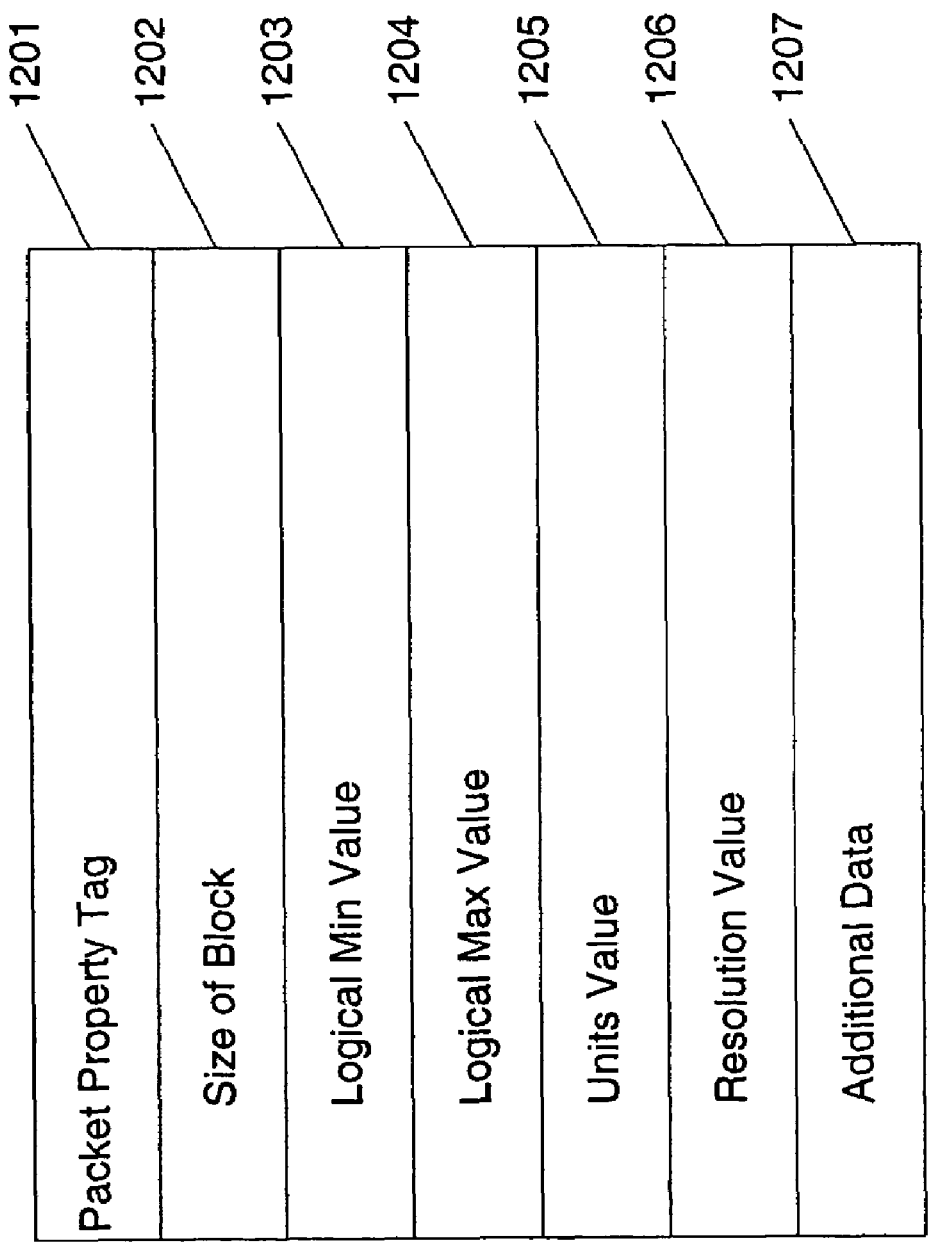
FIG. 12 shows a data structure for storing packet properties in accordance with embodiments of the present invention.

Referring to FIG. 10, each stroke descriptor block may include an identifier 1001. Here, the following tag may be used: TAG_STROKE_DESC_BLOCK. The size 1002 generally follows the identifier 1001.

It is assumed herein that, by default, all strokes will contain X and Y coordinate data arrays and that these will be the first data arrays stored in a stroke. This provides the ability for the stroke to default to looking for X and Y coordinate data (which is more likely than having strokes lack X and Y data). If for some reason the application does not wish to store X and Y coordinates, then it may create a stroke descriptor block containing placeholders to occupy the designated fields for the X and Y coordinate arrays. Here, the placeholders are No X Data Tag 1003 and No Y Data Tag 1004. One may also use TAG_NO_X and TAG_NO_Y values as the two entries. Otherwise the first two arrays in a stroke may be assumed to correspond to the X and Y coordinates.

After the optional TAG_NO_X, TAG_NO_Y placeholders is an array of packet property tags 1005. This array ends when a button identifier or a stroke property identifier is encountered. These may be represented as well as TAG_BUTTONS, TAG_STROKE_PROPERTY_LIST or the end of scope is encountered. Each packet property tag defines another array in the stroke.

Following the packet property array 1005 may be an optional "buttons" section that describes the button bit-fields that make up the elements of the button array in the stroke. Not all input devices report button states, so this section is optional. If present, the "buttons" section may start with a first button description tag 1006 (e.g., a tag may be TAG_BUTTONS) followed by the count of buttons 1007 (as represented by an identifier, for instance, "cButtons") and an array of button GUID tags 1008, one tag for each button. Note that these tags may be encoded (described later) and the size of the button array may not be an exact multiple of the number of buttons (cButtons).

If the end of the stroke descriptor block scope has not been reached, then what may follow is a stroke property list. The stroke property list may include identifier 1009 (one may also use TAG_STROKE_PROPERTY_LIST). Following the identifier 1009 is a list of stroke property tags in the array of tags for stroke properties 1010. These tags do not describe arrays of values. Instead they are an optimization that allows a tag that appears repeatedly in strokes to be omitted; only the size and the data need to be specified for the listed property. A stroke may still have additional stroke properties that are not listed in its stroke descriptor block under TAG_STROKE_PROPERTY_LIST. However, these additional properties may have to be listed in the stroke after all the properties listed in the block and they should be tagged explicitly within the stroke.

5) Transform Table

As described above, ink may be captured in a variety of ways. The ink may be made larger or smaller, rotated, translated, warped, and the like. These transformations present a variety of problems. The first problem is that the assumptions made when designing the compression schemes may no longer be valid. This may result in data that would have been compressed well in its native form to bloat and compress very poorly. The second problem is that it is very easy to perform operations on the ink that would cause precision to be lost. This may cause the recognition process to fail and prevent the ink from being converted to text or might cause the ink to render incorrectly.

To solve this problem, some embodiments of the present system may allow the ink to be stored in its original native format. For example, whenever ink is transformed, only a transform matrix is affected rather than each point in the ink. This preserves the precision of the original ink and also allows compression to function optimally.

The transform table may list all transform blocks in the stream. Each transform block may define a unique transform that is applied to the ink points before they are rendered or used. These blocks may apply to one or more strokes and are placed in this table so that they are not repeated in each stroke.

One may use the identifier of TAG_TRANSFORM_TABLE to identify the transform table. The size of the table may follow. The size of the table may be is equal to the sum of the sizes of all transform blocks.

A transform table containing only one transform block is a special case. The tag and size for the table may be omitted and the entire table may be replaced by a single transform block.

In the simplest case and the cases where scaling and transforms have been applied outside of a native capture environment (for example when currently using ink in MS Word), no transform tables may be created 6) Metric Table The metric table lists metric blocks in the stream. These blocks may apply to one or more strokes and may be placed in this table so that they are not repeated in each stroke.

The tag, TAG_METRIC_TABLE, may be used to identify the metric table and may be followed by the size of the table. The size of the table is equal to the sum of the sizes of all metric blocks.

A metric table containing only one metric block is a special case. The tag and size for the table may be omitted and a single metric block may replace the entire table.

One previous example showed how an ink stream may contain only strokes made up of X and Y elements. The stroke descriptor then enabled the addition of more properties to a stroke. The metric block further refines the definition of the properties defined in a stroke. The individual array elements in a stroke, such as the X or Y values, may be represented in logical device coordinates. However there may well be times where an application will need to know the relationship between these logical values and some real physical characteristics. For example, it may not be known implicitly whether pressure is in pounds, Pascal's or kilograms, or an angle with a value of 10 is in degrees or radians. Without further information an application may assume these values are in the standard normalized form, as defined by the ink object system.

One purpose of the metric block is to defining some relationship between the logical units stored in the stroke and physical characteristics. The most common ones being: minimum value, maximum value, precision, and/or units.

Typically all strokes in an ink stream will use the same metrics block. An ink stream may have several stroke descriptors, yet still only have one metric block. However, the present system may allow different strokes to refer to different metric blocks in the metric table.

Each metric block may start with an identifier 1101 (for example, TAG_METRIC_BLOCK) and is followed by the size 1102 of the block. The TAG_METRIC_BLOCK may be omitted in the metrics table. Next, each entry may follow as entry[0] 1103—entry[number of metric blocks-1] 1105. The various entries may describe minimum and/or maximum values for values, the degree of precision and associated units, as well as other properties.

The metric block does not necessarily need to define all the packet property tags that are used in the stroke descriptor, since the application may not care about the metrics associated with all the properties or the device may not provide metrics for all the properties. In order to permit the metric block to be easily read in conjunction with the stroke descriptor, the entries in the metric block should be in the same order as found in the stroke descriptor. The metric block differs from the stroke descriptor since it may contain data for X and Y values (for example, identified with TAG_X and TAG_Y). This is because X and Y values may have metrics that need to be stored.

7) Compression Header

A block may be specified that addresses the amount of compression to apply to values. The header may contain data used by decompression algorithms to correctly decompress packet property arrays including X, Y coordinates, pressure and the like. Inclusion of compression data may occur when the system determines that predefined compression algorithms and their associated levels of compression may not be enough to store information to achieve the maximal compression of ink.

The type of compression used may include various compression algorithms as are known in the art including Huffman compression algorithms and others. The compression header may include an identifier, the number of bytes needed to store the header, a bit assignment table including bit assignment blocks, and/or (optionally) an index map table. If the bit assignment table is zero, null, or nonexistent, then the index map table may not be included to save space.

8) Custom Ink Properties

Custom ink properties may be defined for various applications. The identifier for a custom ink property may list a custom GUID specified in the GUID table. Next, the size of the compressed data for the property may be is provided. Finally, the data associated with the property may be provided. Additional data may follow in the stream relating to the next property.

Like global properties, local properties may also be specified. Local properties may be positioned after the global ink properties. Alternatively, as described above, global ink properties may be placed lasted in an ink object. Local properties do not apply to the entire ink stream. Strokes are an example of a local property. Other local properties, such as a drawing attribute index, may apply to all the strokes that appear after that point in the stream until the next time that local property appears in the stream again. Just like global ink properties, local properties are also optional. A valid ink stream could potentially contain no local properties at all. However, such a stream would not likely be useful.

The local properties may include, for example:
1) a drawing attribute index;
2) a stroke descriptor index;
3) a transform index;
4) a metrics index; and
5) strokes 1) Drawing Attribute Index The drawing attribute index (which may be identified by the tag TAG_DIDX) assigns a drawing attribute block to a stroke. The drawing attribute index may be followed by an index value that specifies the entry in the drawing attributes table. All strokes in the stream from that point on may use the specified drawing attribute block until the next drawing attribute index is encountered in the stream.

In an alternative embodiment, if there is no drawing attribute index in the stream somewhere before the stroke, it may be assumed that this stroke should use the 0th (i.e., first) drawing attribute block in the drawing attributes table. And if there is no drawing attributes table in the stream, then all strokes may be drawn using the default set of drawing attributes.

2) Stroke Descriptor Index

A stroke descriptor index (which may be identified using a tag as TAG_SIDX) assigns a stroke descriptor block to a stroke. A stroke descriptor index may be followed by an index value that specifies the entry in the stroke descriptor table. All strokes in the stream from that point on may use the specified stroke descriptor block until the next stroke descriptor index is encountered in the stream.

In an alternate embodiment, if there is no stroke descriptor index in the stream somewhere before the stroke, it may be assumed that this stroke should use the 0th Stroke descriptor block in the stroke descriptor table. And if there is no stroke descriptor table in the stream, then all strokes may be assumed to contain X and Y coordinates only.

3) Transform Index

The transform index (which may be specified with the identifier TAG_TIDX) assigns a transform block to a stroke. A transform index may be followed by an index value that specifies the entry in the transform table. All strokes in the stream from that point on may use the specified transform block until the next transform index is encountered in the stream.

In an alternate embodiment, if there is no transform index in the stream somewhere before the stroke, it may be assumed that this stroke should use the 0th transform block in the transform table. And if there is no transform table in the stream, then no transforms should be applied to any stroke.

4) Metric Index

The metric index (which may be identified using the tag TAG_MIDX) assigns a metric block to a stroke. The metric index may be followed by an index value that specifies the entry in the metric table. All strokes in the stream from that point onward may use the specified metric block until the next metric index is encountered in the stream.

In an alternate embodiment, if there is no metric index in the stream somewhere before the stroke, this stroke may use the 0th (i.e., first) metric block in the metrics table. If there is only one metric block then the table may be omitted and the 0th metric block is the only metric block in the stream.

5) Strokes

As described earlier with relation to FIG. 8, strokes are one of most important properties in ink. Strokes contain the packet data that make up the individual points in a stroke and potentially other per-stroke properties as well.

Figure 13:
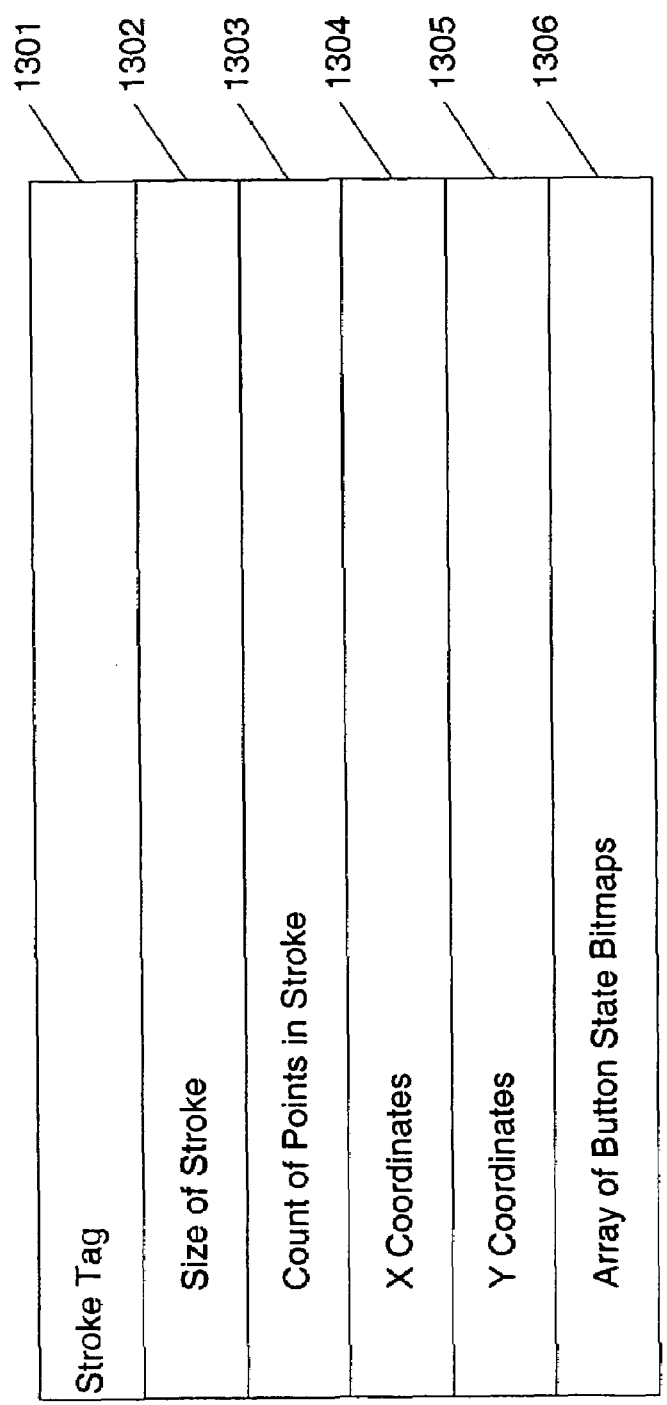
FIG. 13 shows another data structure storing strokes in accordance with embodiments of the present invention.

As shown in FIG. 13, the stroke may begin with an identifier of the stroke 1301 (for example, TAG_STROKE) and may be followed by a size field 1302 (e.g., that is the count in bytes of all the data starting from (and including) the number of point in the stroke 1304 to the end of the stroke). The number of points 1303 may follow the size of the stroke 1302 and defines how many points are stored in the packet data of this stroke.

The data contained in the stroke is found in fields after the number of points 1303. The packet data may include of arrays of values (X coordinate information 1304, Y coordinate information 1305), where each array is in the same order as described in the stroke descriptor for the stroke. If the stroke descriptor did not specify that no X or Y data was included (for example, the identifiers TAG_NO_X or TAG_NO_Y), then the first two arrays may be the X and Y coordinate arrays. In the situation where the stroke contains no packet data at all, the number of points from field 1303 may be zero.

Next, the stroke may include button states. Each button state for each point may be stored as a bit in the array. The button state may be stored compressed or uncompressed. The number of button states may be stored (and read from the stroke descriptor). In the compressed storage of button states, the compressed button array uses the number of points* ((number of button states+7)/8) bytes in the stream to store all the state information for each point. Making substitutions, if one uses cPoints to represent the number of points and cButtons to represent the number of buttons, the resulting storage size for the buttons=cPoints*((cButtons+7)/8) bytes. This storage efficiency may be improved by the fact that to store the same information in a non-serialized format requires ((cButtons+31)/8) bytes for each packet.

Stroke properties follow packet data (if non-default stroke properties are to be used). Stroke properties are listed by an identifier. For example, the identifier TAG_STROKE_PROPERTY_LIST may be used. The stroke properties may appear after the buttons array. In some embodiments, the stroke properties may have their tags omitted since the tags are specified in the stroke descriptor. The system continues to process all parts of the stroke. If the end of the stroke scope has still not been reached, then more stroke properties may be specified listing the properties with their tags.

In addition to strokes having properties, individual points may have properties as well. As point properties are stroke properties assigned to a point, they are defined with stroke properties. A sample point property list may be shown in FIG. 14. The point property list starts with an identifier 1401 (for example, one may use TAG_POINT_PROPERTY as the identifier), which may be followed by the size of the whole point property list as provided in field 1402. After the size of the whole point property list 1402, the tagged point properties follow.

Figure 14:
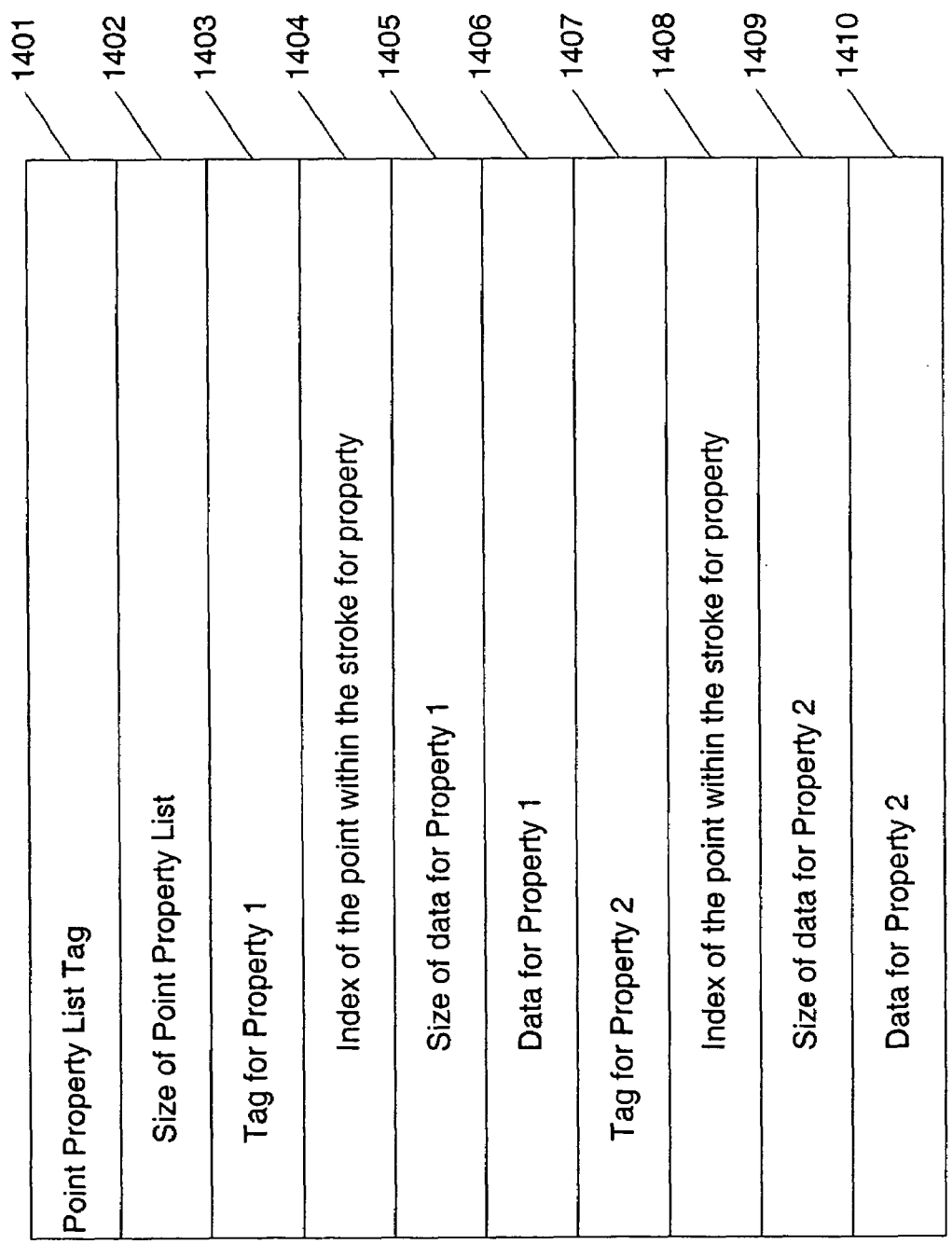
FIG. 14 shows a data structure storing a point property list in accordance with embodiments of the present invention.

In FIG. 14, two properties are specified, namely property 1 and property 2. The tags for property 1 and property 2 are specified in fields 1403 and 1407, respectively. Next, the index of the point within the stroke may be provided (field 1404 for property 1 and field 1408 for property 2). Next, the size data of the properties are provided (in field 1405 for property 1 and in field 1409 for property 2). Finally, the data for the properties are provided in fields 1406 and 1410 for property 1 and property 2, respectively.

A Complex Example

FIG. 15 shows a complex example of an ink object. The complex example includes a number of the fields and tags described above. The entries in the ink object 1501 are described below.

| | |
|---|---|
| Ink Object Identifier | Identifies data structure as an Ink Object |
| Size/Count of the Rest of the Object | Size/count of the rest of the ink object |
| Stroke Descriptor Table Tag | Tag for stroke descriptor table |
| Size of Table Having Two Blocks | Size of stroke descriptor table containing two blocks |
| Size = 1 (for the first block) | Size of the $0^{th}$ block is 1 length, only X, Y in these strokes |
| Normal Pressure Tag | Indicates pressure is the first thing after X, Y |
| Size = 0 (for the second block) | Size of the $1^{st}$ stroke descriptor block |
| Metrics Block Tag | The only metrics block in the stream |
| Size/Count of the Metric Block | Size/Count of Metric block |
| Normal Pressure Tag | Metrics for X and Y are not stored in this example. |
| Size/count for Normal Pressure Block | Size/count of the normal pressure block |
| Min Pressure {−10} | Minimal allowed value for pressure, e.g. −100 {may specify minimum in portion} |
| {10} | No value in the stream will be below 10 {Value may be separately specified} |
| Max Pressure {−90} | Maximal allowed value for pressure e.g. +100 {may specify maximum in portion} |
| {90} | No value in the stream will be above 90 {Value may be separately specified} |
| Precision {−1} | Precision of device. E.g. 100 per unit {may specify value} |
| {1} | Precision of device logical units are in increments of 1 {value may be separately specified} |
| Units {−2} | Units for the precision. e.g. value indicating tons {may specify value} |
| {2} | Numeric value indicating units. If this number indicated that the units where in kilograms then because precision is 1 then each increment of logical units would be a kilo {value may be separately specified} |
| Stroke Tag | Tag for the stroke |
| Size/count of the stroke and related strokes | Size/count for stroke and all its children |
| Number of points in stroke | Count of points in this stroke |
| X data | Compressed X coordinates |
| Y data | Compressed Y coordinates |
| Pressure data | Compressed normal pressure data |
| Stroke Descriptor Table Index Tag | Tag for index into a stroke descriptor table |
| 1 | Value for the stroke descriptor index |
| Stroke Tag | Tag for stroke object |
| Size/count of the stroke and related stroke properties | Size/count for stroke and related properties |
| Number of points in stroke | Count of Points in this stroke |
| X data | Compressed X coordinates |
| Y data | Compressed Y coordinates |
| Stroke Tag | Tag for stroke object |
| Size/count of the stroke and related stroke properties | Size/count for stroke and related properties |
| Number of points in stroke | Count of Points in this stroke |
| X data | Compressed X coordinates |
| Y data | Compressed Y coordinates |

In the example shown, at the beginning of the stream, before any strokes, there may be a stroke descriptor table with two stroke descriptor block entries. The 0th entry in the stroke descriptor table has size zero, i.e. it may be empty. This signifies that the strokes, which are described by this entry, contain only X and Y vectors. The 1st entry of the stroke descriptor table describes the strokes that in addition to X and Y arrays contain a pressure vector. Here, this entry does not contain descriptors for X and Y arrays. Rather, they are implicit. In contrast, only pressure is described with its minimal and maximal values.

FIG. 15 next shows the stroke descriptor table with an index table after it. The stroke descriptor table index value refers to all the strokes in the ink object that follow in the stream, until the end of the ink stream or until a next stroke descriptor table index may be found in the stream.

In the example above, the stroke descriptor table index value of 1 applies to the 0th stroke and the stroke descriptor table index value of 0 applies to the 1st and 2nd strokes. Therefore, the 0th stroke contains pressure vector in addition to X and Y vectors, the 1st and 2nd strokes only contain X and Y vectors.

Figure 17:
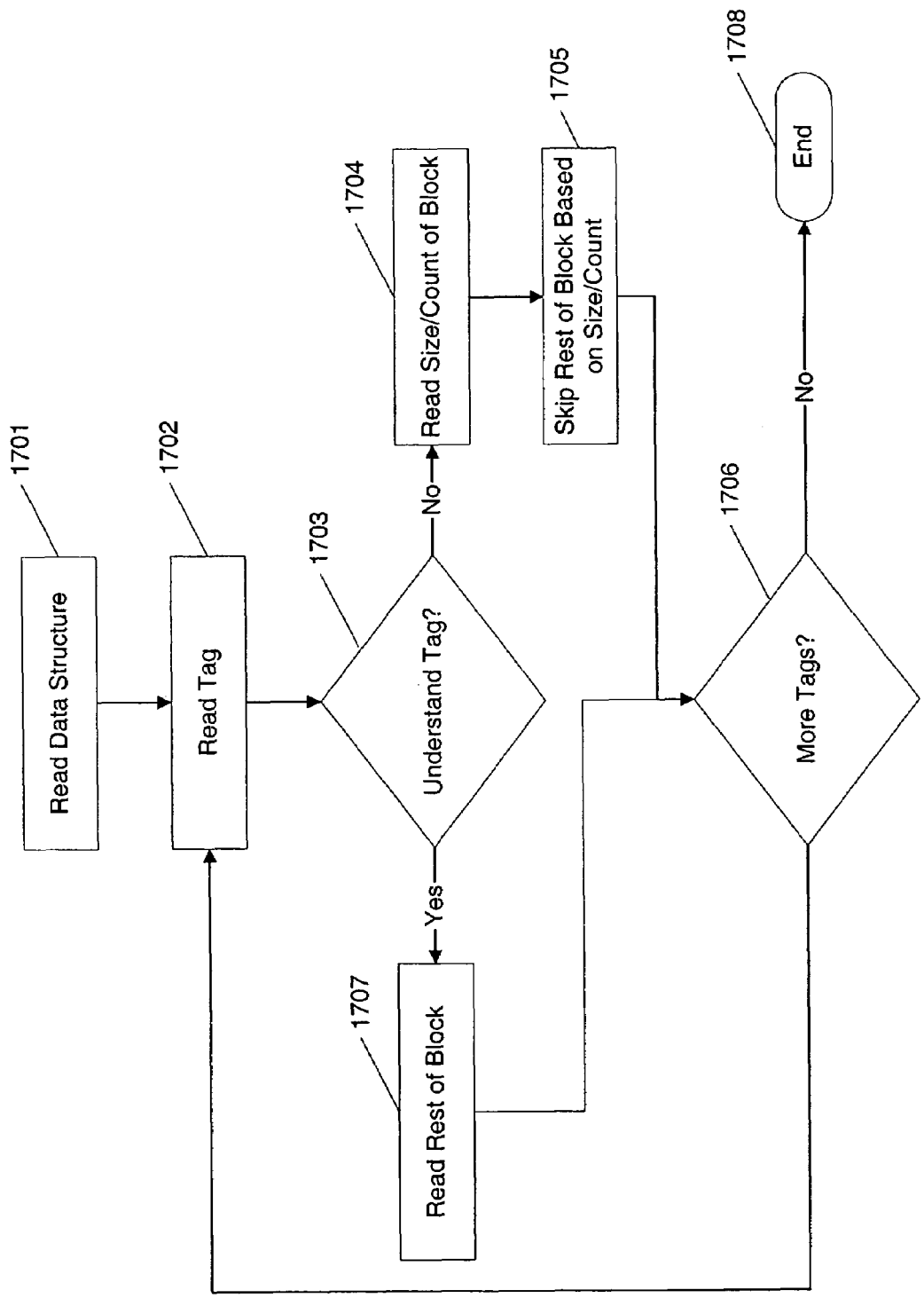
FIG. 17 shows a first method for reading a data structure with known and unknown properties in accordance with embodiments of the present invention.
Figure 18:
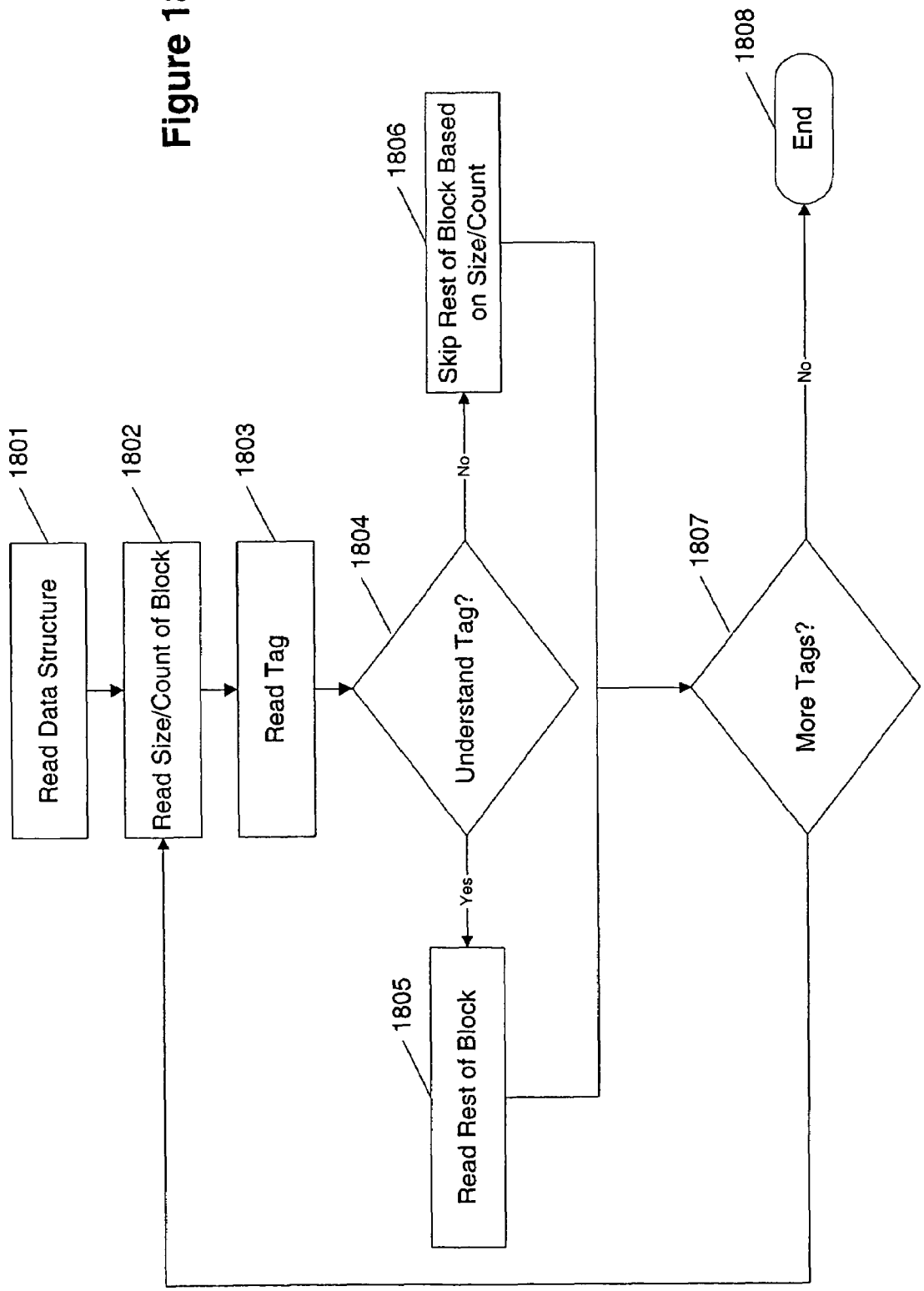
FIG. 18 shows a second method for reading a data structure with known and unknown properties in accordance with embodiments of the present invention.

FIGS. 17 and 18 describe two processes for reading a stored ink object. In FIG. 17, the system starts reading the data structure in step 1701. Next, a tag may be read in step 1702. If the system understands the tag (step 1703), it proceeds to read the rest of the block following the tag (step 1707). If the system does not understand the tag, it reads the next entry, which may be the size (or count) of the rest of the block in step 1704, and skips past the end of the block as based on the read size (or count) in step 1705. Next, the system determines if there are more tags to read in step 1706. If no, then reading of the ink object stops in 1708, otherwise the system reads the next tag in step 1702.

In FIG. 18, the size (or count of items) of the tag may be read first. This may occur by placing the size or count information ahead of the tag identifier. The system starts reading the data structure in step 1801. Next, the size or count of the block may be read in step 1802. Next, a tag may be read in step 1803. If the system understands the tag (step 1804), it proceeds to read the rest of the block following the tag (step 1805). If the system does not understand the tag, it skips past (step 1806) the end of the block as based on the read size (or count) in step 1802. Next, the system determines if there are more tags to read in step 1807. If no, then reading of the ink object stops in 1808, otherwise the system reads the next tag in step 1802. The size or count of items (as read in step 1802) may or may not include the reference to the size or count of the tag (as read in step 1803).

While not shown, a further implementation is possible. The system may eliminate the size component of the data structure. To skip to the next tag, the system may scan for a predefined tag identifier (for example, "INK_" or the like) or any other series of values. Also, the system may scan for a terminator of the present tag (for example, "1111111").

Encoding of Values

The serial nature of the ink object leads to efficient storage. In some embodiments, the values in the ink object may be encoded to further reduce the size of the stream needed to store the ink object. In one example, tags are indexes to GUIDs so that the GUID may be not repeated unnecessarily. In the above examples, X and Y data may be compressed. A number of encoding strategies and compression methods may be used alone or in combination.

Sizes of Tags and Numbers

At the most basic level, the ink object may be composed of numbers. Even tags may be considered indexes, which are just small integer numbers. In fact, most of the time these numbers are small enough that they could be represented by a single byte if there was a way of determining when a byte represented a single number and when it was just part of a bigger number. In some embodiments, no encoding is used. In other embodiments, it may be possible to take advantage of this observation by encoding numbers using a multi-byte encoding technique.

Multi-byte encoding makes it possible to represent small numbers in one byte, larger numbers in two bytes and very large numbers in however many bytes are necessary. This means that tags, which usually have a value less than 100, are stored as a single byte and sizes, which may be small or large, are stored in the most efficient manner. In effect, multi-byte encoding may be a compression technique.

Various types of multi-byte encoding are known. An example of multi-byte encoding is shown and works as follows:

a. Numbers less than 128 are encoded in one byte.
  b. The most significant bit remains in the byte clear.
  c. Multi-byte encoding interprets the most significant bit being clear to mean this may be the last byte in a number.
  d. Numbers larger than 128 are broken up into 7 bit segments.
  e. The 7 bit segments are then each stored in a byte.
  f. And the most significant bit in each byte except the last may be set.

In other words, the system handles information such that:

a. Numbers less than $2^7=128$ are encoded in a single byte.
  b. Numbers less than $2^{14}=16384$ are encoded in two bytes.
  c. Numbers less than $2^{21}=2097152$ are encoded in three bytes.
  d. Etc.

In general, bytes are processed until a byte with the most significant bit clear may be encountered. For example, the first number encountered may be the ink object identifier number. For version 1.0 this value may be "0" and can be encoded in a single byte. The next number may be the size of the stream following the size value, and for small ink objects as in the first example this will also be encoded in a single byte. However, if the stream may be long this value can grow as large as necessary. For example, a multi-byte encoded number of 10 bytes can represent a 64-bit number.

This same process may be applied to "tags" and other values in the stream. In general since "tags" are small integer indexes, they too will be one byte encoded.

Multi-Byte Encoding of Signed Numbers

Multi-byte encoding as described above works well for positive integers. However, in some cases it may be necessary to store signed numbers. For example, the coordinates of a point may be positive or negative depending on where the application situates the origin.

To multi-byte encode a signed number, the absolute value of the signed number may be determined, the absolute value then may be shifted left by 1 bit, and the sign of the original number may be stored in the list significant bit.

Using the technique set forth above, the signed numbers with absolute values are handled as follows:

a. Numbers less than $2^6=64$ are encoded in one byte,
  b. Numbers less than $2^{13}=8192$ are encoded in 2 bytes
  c. etc.

Tags for Predefined and Custom GUIDs

Representing tags with indices into a GUID table may be another technique used to make the ink object efficient. As was already mentioned above, some of these GUIDS are predefined while others are custom to the application. The first 100 entries in the table are reserved and are not stored in the serialized stream.

In one example, only custom GUIDs, which may be represented by indices greater than 100, may be stored in the serialized format. The GUID table identifier (e.g., TAG_GUID_TABLE) in the stream identifies the custom GUID look up table. In such an example, the custom GUID table may be part of the ink stream only if the ink object contains at least one custom GUID.

As mentioned above, the system may use multi-byte encoding for the various tags listed above. As long as an application does not use more than a certain number (e.g., 27) of custom properties in any given ink object, then the all tags may be encoded using only a single byte.

A Summarization of the Storage of Ink

Ink may be stored in an ink object with the ink object providing coordinate data and/or other properties associated with strokes. Compression may be used to increase the efficiency at which the ink may be stored.

Although the invention has been defined using the appended claims, these claims are exemplary in that the invention may be intended to include the elements and steps described herein in any combination or sub combination. Accordingly, there are any number of alternative combinations for defining the invention, which incorporate one or more elements from the specification, including the description, claims, and drawings, in various combinations or sub combinations. It will be apparent to those skilled in the relevant technology, in light of the present specification, that alternate combinations of aspects of the invention, either alone or in combination with one or more elements or steps defined herein, may be utilized as modifications or alterations of the invention or as part of the invention. It may be intended that the written description of the invention contained herein covers all such modifications and alterations. For instance, in various embodiments, a certain order to the data has been shown. However, any reordering of the data is encompassed by the present invention. Also, where certain units of properties such as size (e.g., in bytes or bits) are used, any other units are also envisioned.

The invention claimed is:

1. A system for creating a data structure comprising:
an input configured to receive at least first and second ink strokes;
a processor configured to parse the received ink strokes and to determine at least a first and a second property associated with the ink strokes; and
a storage configured to store the ink strokes in a data structure with at least one tag identifying and delimiting data associated with said at least first and second property, thereby allowing said system to ignore data not understood,
the data structure further including a portion containing index data associated with said at least first and second property of the handwritten ink information, the tag data having a reference to the index data, wherein the first property of the handwritten ink information associated with the index data is applied to the tag data and the first ink stroke based on the reference and the second property of the handwritten ink information associated with the index data is applied to the tag data and the second ink stroke based on the reference, and wherein the properties include at least one of a specific color, line width, drawing attribute, count of points, stroke size, a shape of pen tip, a type of pen tip, a point at which a stylus starts a stroke, stroke coordinates, pressure, angle of pen, and interval of time between coordinates.

2. The system according to claim 1, wherein said identifying tag is an index to a point in one of said ink strokes.

3. The system according to claim 1, wherein said data structure includes a size of data relating to said property.

4. A system for using a data structure comprising:
a storage configured to store first and second ink strokes in a data structure with at least one tag identifying at least a first and a second property, the data structure including a portion containing index data associated with said at least first and second property of the handwritten ink information, the tag data having a reference to the index data; and,
a processor configured to retrieve the ink strokes and said at least one tag and apply said first property of the handwritten ink information associated with the index data to the tag data and the first ink stroke based on the reference and apply the second property of the handwritten ink information associated with the index data to the tag data and the second ink stroke based on the reference when rendering said ink strokes, and wherein the properties include at least one of a specific color, line width, drawing attribute, count of points, stroke size, a shape of pen tip, a type of pen tip, a point at which a stylus starts a stroke, stroke coordinates, pressure, angle of pen, and interval of time between coordinates.

* * * * *